US012659958B2

(12) United States Patent

Huang et al.

(10) Patent No.: US 12,659,958 B2
(45) Date of Patent: Jun. 16, 2026

(54) COMMUNICATION METHOD AND APPARATUS FOR IMPROVING UPLINK SIGNAL TRANSMISSION GAIN

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 382 days.

(21) Appl. No.: 17/786,981

(22) PCT Filed: Nov. 18, 2020

(86) PCT No.: PCT/CN2020/129866
§ 371 (c)(1),
(2) Date: Jun. 17, 2022

(87) PCT Pub. No.: WO2021/129245
PCT Pub. Date: Jul. 1, 2021

(65) Prior Publication Data
US 2023/0040978 A1 Feb. 9, 2023

(30) Foreign Application Priority Data

Dec. 26, 2019 (CN) .......................... 201911368904.9

(51) Int. Cl.
*H04W 4/00* (2018.01)
*H04L 5/00* (2006.01)
(Continued)

(52) U.S. Cl.
CPC ........... *H04W 72/21* (2023.01); *H04L 5/0051* (2013.01); *H04W 72/0453* (2013.01)

(58) Field of Classification Search
CPC . H04W 72/21; H04W 72/0453; H04W 72/23; H04L 5/0051; H04B 7/063; H04B 7/0639; H04B 7/0413
See application file for complete search history.

(56) References Cited

U.S. PATENT DOCUMENTS

| | | | |
|---|---|---|---|
| 11,071,172 B2 * | 7/2021 | He | H04W 52/0251 |
| 2008/0043677 A1 * | 2/2008 | Kim | H04B 7/066 |
| | | | 370/332 |

(Continued)

FOREIGN PATENT DOCUMENTS

| | | |
|---|---|---|
| CA | 3052785 A1 | 8/2018 |
| CN | 108112075 A | 6/2018 |

(Continued)

OTHER PUBLICATIONS

Mpirical Glossary—PRB Physical Resource Block—Retrieved from https://www.mpirical.com/glossary/prb-physical-resource-block on Jul. 12, 2024. (Year: 2024).*

(Continued)

*Primary Examiner* — Edan Orgad
*Assistant Examiner* — Hidayat Dabiri
(74) *Attorney, Agent, or Firm* — Meunier Carlin & Curfman LLC

(57) ABSTRACT

Disclosed are a communication method and apparatus for improving a transmission gain of an uplink signal. The method includes: a terminal device determines, in an uplink resource, at least one first sub-band for transmitting an uplink signal; the terminal device transmits the uplink signal according to the received indication information, sent by a network device, of the uplink signal and the at least one determined first sub-band, where the indication information is used for indicating a transmission parameter and/or a transmission antenna of the uplink signal.

17 Claims, 5 Drawing Sheets

(51) Int. Cl.
  H04W 72/0453 (2023.01)
  H04W 72/21 (2023.01)

(56) References Cited

U.S. PATENT DOCUMENTS

| | | | | |
|---|---|---|---|---|
| 2017/0325236 | A1* | 11/2017 | Yu | H04L 5/0091 |
| 2018/0367193 | A1* | 12/2018 | Tan | H04B 7/0639 |
| 2019/0200334 | A1* | 6/2019 | Sasaki | H04L 1/1896 |
| 2019/0327045 | A1* | 10/2019 | Zhang | H04B 7/0691 |
| 2020/0002212 | A1 | 1/2020 | Li et al. | |
| 2020/0022125 | A1* | 1/2020 | Li | H04W 72/044 |
| 2020/0119783 | A1 | 4/2020 | Liu et al. | |
| 2020/0169304 | A1 | 5/2020 | Chen et al. | |
| 2021/0112537 | A1* | 4/2021 | Lu | H04W 72/23 |
| 2021/0329603 | A1* | 10/2021 | Zhao | H04W 72/02 |
| 2022/0070871 | A1* | 3/2022 | Tang | H04L 5/0094 |

FOREIGN PATENT DOCUMENTS

| | | | |
|---|---|---|---|
| CN | 108668367 | A | 10/2018 |
| CN | 109075828 | A | 12/2018 |
| EP | 3541131 | A1 | 9/2019 |
| WO | 2016119440 | A1 | 8/2016 |
| WO | 2017157466 | A1 | 9/2017 |
| WO | 2018017424 | A1 | 1/2018 |
| WO | 2018177259 | A1 | 4/2018 |
| WO | 2018228228 | A1 | 12/2018 |
| WO | 2019108915 | A2 | 6/2019 |
| WO | 2019026514 | A1 | 7/2019 |

OTHER PUBLICATIONS

3rd Generation Partnership Project, "Technical Specification Group Radio Access Network," 3GPP TS 38.212 v15.2.0, Multiplexing and channel coding (Release 15); (Jun. 2018).

* cited by examiner

100

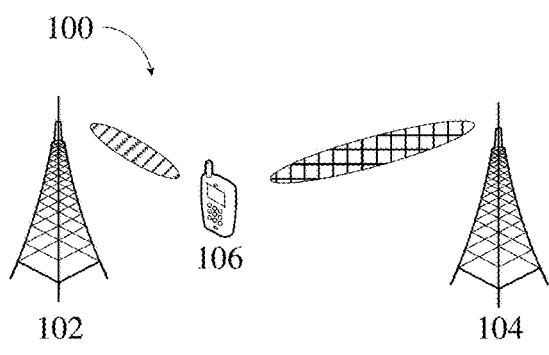

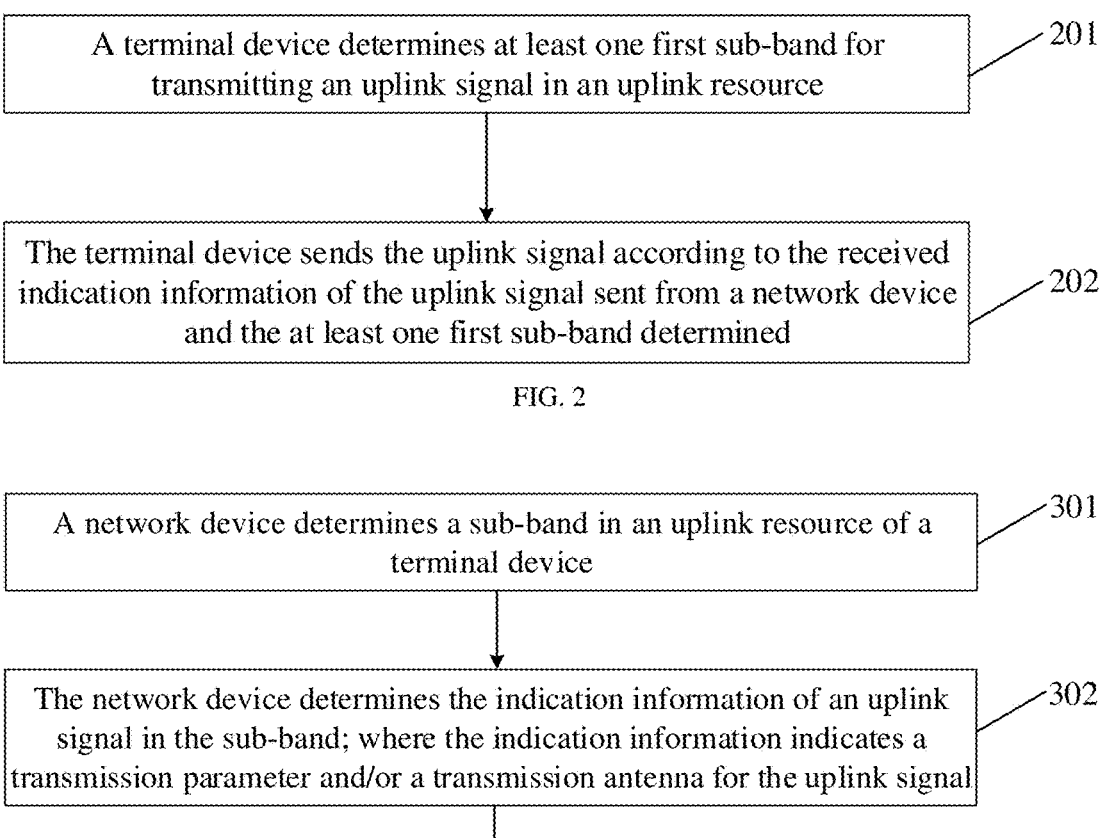

A terminal device determines at least one first sub-band for transmitting an uplink signal in an uplink resource — 201

The terminal device sends the uplink signal according to the received indication information of the uplink signal sent from a network device and the at least one first sub-band determined — 202

FIG. 2

A network device determines a sub-band in an uplink resource of a terminal device — 301

The network device determines the indication information of an uplink signal in the sub-band; where the indication information indicates a transmission parameter and/or a transmission antenna for the uplink signal — 302

The network device sends the indication information to the terminal device — 303

FIG. 3

| Network device | | Terminal device |

Step 401: the network device
determines a sub-band in an uplink
resource of the terminal device Step 402: the network device
determines the indication information
of an uplink signal using the sub-band Step 403: the network device sends the indication
information of the uplink signal of the terminal device
to the terminal device Step 404: the terminal device
determines at least one first sub-band
for transmitting the uplink signal in
an uplink resource Step 405: the terminal device sends the uplink signal
according to the received indication information
and the at least one first sub-band determined

FIG. 4

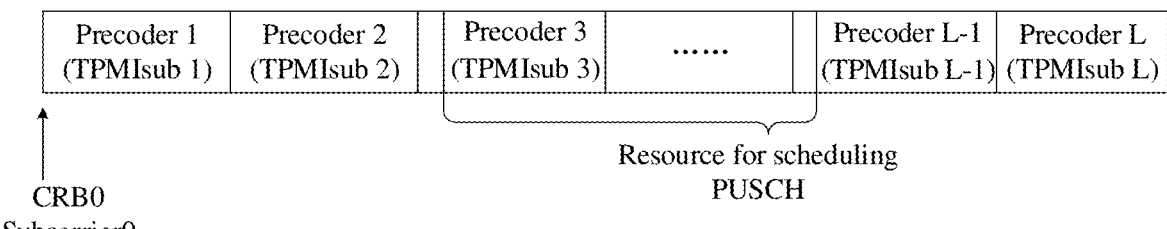

| Precoder 1 (TPMIsub 1) | Precoder 2 (TPMIsub 2) | Precoder 3 (TPMIsub 3) | ...... | Precoder L-1 (TPMIsub L-1) | Precoder L (TPMIsub L) |

CRB0
Subcarrier0

Resource for scheduling
PUSCH

FIG. 5

COMMUNICATION METHOD AND APPARATUS FOR IMPROVING UPLINK SIGNAL TRANSMISSION GAIN

CROSS-REFERENCE OF RELATED APPLICATIONS

The disclosure is a US National Stage of International Application No. PCT/CN2020/129866, filed on Nov. 18, 2020, which claims the priority from Chinese Patent Application No. 201911368904.9, filed with China National Intellectual Property Administration on Dec. 26, 2019 and entitled "Communication Method and Apparatus", which is hereby incorporated by reference in its entirety.

TECHNICAL FIELD

The disclosure relates to the field of communication technologies, and in particular, to a communication method and apparatus.

BACKGROUND

In existing wireless communication systems, such as Long Term Evolution (LTE) system and New Radio (NR) system, the Multiple Inpit Multiple Output (MIMO) transmission of uplink signals only supports broadband precoding but does not support sub-band precoding.

For example, in the codebook-based Physical Uplink Shared Channel (PUSCH) uplink transmission scheme, the base station can only indicate the broadband uplink Sounding Reference Signal (SRS) resource, a precoding matrix and the number of layers to a User Equipment (UE). When transmitting the PUSCH, the UE uses the same analog beamforming, precoding matrix and number of layers on all scheduled frequency-domain resources. Here, the SRS resource may be indicated by the SRS Resource Indicator field in the Downlink Control Information (DCI) or by the Radio Resource Control (RRC) signaling, and the precoding matrix and the number of layers may be indicated by the fields of the precoding information and the number of layers in the DCI or by the RRC signaling.

For another example, in the non-codebook-based PUSCH uplink transmission scheme, the base station indicates a broadband SRS resource to the UE, for example, indicates the SRS resource through the SRS resource indicator field in the DCI or through the RRC signaling. When transmitting the PUSCH, the UE uses the same analog beamforming, precoding matrix and number of layers on all scheduled frequency-domain resources.

The sub-band precoding can bring the selective precoding gain in the frequency domain and improve the performance of uplink signal transmission. During the discussion of the 3rd Generation Partnership Project (3GPP) NR system, introduction of the sub-band precoding for the uplink PUSCH was considered.

However, there is no specific solution on the method for the base station to indicate the sub-band precoding of an uplink signal and how the UE determines the precoding method of the uplink signal on the allocated resource during the sub-band precoding transmission in the prior art.

SUMMARY

The disclosure provides a communication method and apparatus, so as to improve the transmission gain of an uplink signal.

In a first aspect, the disclosure provides a communication method, including:

determining, by a terminal device, at least one first sub-band for transmitting an uplink signal in an uplink resource;

sending, by the terminal device, the uplink signal according to indication information of the uplink signal sent from a network device and the at least one first sub-band determined, wherein the indication information indicates a transmission parameter and/or a transmission antenna for the uplink signal.

In the above method, the terminal can determine the first sub-band for transmitting the uplink signal in the uplink resource, and communicates the uplink signal with the network device on the determined first sub-band according to the indication information of the uplink signal, thereby improving the transmission gain of the uplink signal.

In a possible implementation, determining, by the terminal device, at least one first sub-band for transmitting an uplink signal in an uplink resource, includes:

determining, by the terminal device, a first frequency-domain starting position;

determining, by the terminal device, the at least one first sub-band in the uplink resource according to the first frequency-domain starting position.

In the above method, the terminal device can determine the first sub-band in the uplink resource according to the first frequency-domain starting position, which is easy to implement.

In a possible implementation, determining, by the terminal device, the at least one first sub-band according to the first frequency-domain starting position, includes:

determining, by the terminal device, a plurality of second sub-bands in the uplink resource according to the first frequency-domain starting position, and determining the at least one first sub-band in the plurality of second sub-bands; or determining, by the terminal device, a plurality of second sub-bands in the uplink resource according to the first frequency-domain starting position and a sub-band width, and determining the at least one first sub-band in the plurality of second sub-bands; or determining, by the terminal device, the at least one first sub-band according to the first frequency-domain starting position, a sub-band width, and a frequency-domain resource allocated by the network device for the uplink signal; or determining, by the terminal device, the at least one first sub-band according to the first frequency-domain starting position, a sub-band width, and a quantity of sub-bands.

In the above method, the terminal device can accurately determine the first sub-band for transmitting the uplink signal in the uplink resource, the implementation method is simple, and the transmission gain of the uplink signal can be improved by transmitting the uplink signal through the determined first sub-band.

In a possible implementation, a frequency-domain starting position of any one of the at least one first sub-band is obtained as the first frequency-domain starting position plus an offset that is an integer multiple of the sub-band width; or a frequency-domain starting position of each sub-band in the at least one first sub-band except a specified sub-band is obtained as the first frequency-domain starting position plus an offset that is an integer multiple of the sub-band width.

In the above method, the frequency-domain starting position of each first sub-band can be determined by the first frequency-domain starting position and the sub-band width, so that the terminal device can determine each first sub-band more accurately.

In a possible implementation, determining, by the terminal device, the at least one first sub-band in the plurality of second sub-bands, includes:

determining, by the terminal device, a sub-band corresponding to the frequency-domain resource allocated by the network device for the uplink signal in the plurality of second sub-bands as the at least one first sub-band according to the frequency-domain resource; or determining, by the terminal device, the at least one first sub-band according to an overlapping of the frequency-domain resource allocated by the network device for the uplink signal and the plurality of second sub-bands.

In the above method, when determining a plurality of second sub-bands in the uplink resource, the terminal device can determine the first sub-band for transmitting the uplink signal among the plurality of second sub-bands through the frequency-domain resource allocated by the network device.

In a possible implementation, the indication information includes control information corresponding to all or a part of second sub-bands included in the uplink resources; or the indication information includes control information of the at least one first sub-band for transmitting the uplink signal; and the control information is indicated respectively for all or a part of the at least one first sub-band; or the indication information includes control information of a specified sub-band; where the specified sub-band is indicated by the network device or pre-agreed by the network device and the terminal device.

In the above method, the terminal device can determine the control information of a part or all of the second sub-bands in the uplink resource or the control information of at least one first sub-band through the indication information, and then send the uplink signal through the control information.

In a possible implementation, the control information includes one or more of following:

indication information of a precoding matrix, indication information of the number of layers, spatial relation information, indication information of uplink Sounding Reference Signal (SRS) resources, indication information of a sending antenna, or indication information of an antenna panel.

In a possible implementation, determining, by the terminal device, a plurality of second sub-bands in the uplink resource, includes:

taking, by the terminal device, the first frequency-domain starting position as a frequency-domain starting position of a lowest-frequency sub-band, and determining a plurality of second sub-bands in the uplink resource according to the frequency-domain starting position of the lowest-frequency sub-band;

determining, by the terminal device, the at least one first sub-band, includes:

taking, by the terminal device, the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in a frequency-domain resource of the uplink signal or in the uplink resource.

The above method enables the terminal device to determine the frequency-domain starting position of at least one first sub-band or the frequency-domain starting position of a plurality of second sub-bands according to the frequency-domain starting position of the lowest-frequency sub-band, and the implementation method is simple.

In a possible implementation, the first frequency-domain starting position is a frequency-domain position of a specified Common Resource Block (CRB); or the first frequency-domain starting position is a frequency-domain position of a specified Physical Resource Block (PRB) of an initial uplink Bandwidth Part (BWP); or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in frequency-domain resources allocated by the network device for the uplink signal; or the first frequency-domain starting position is a frequency-domain position of a PRB indicated by the network device through signaling.

The above method can determine the PRB at the first frequency-domain starting position, thereby enabling the terminal device to determine the PRB for transmitting the uplink signal.

In a possible implementation, the at least one first sub-band includes a plurality of PRBs; wherein the PRBs included in the at least one first sub-band are continuous; or the at least one first sub-band includes a sub-band including non-continuous PRBs.

In a possible implementation, sending, by the terminal device, the uplink signal according to the indication information of the uplink signal sent from a network device and the at least one first sub-band determined, includes:

determining, by the terminal device, a transmission parameter and/or a transmission antenna corresponding to the at least one first sub-band according to the indication information;

sending, by the terminal device, the uplink signal according to the transmission parameter and/or using the transmission antenna through the at least one first sub-band.

In the above method, after determining at least one first sub-band for transmitting the uplink signal, the terminal device can determine the transmission parameter and transmission antenna corresponding to at least one first sub-band according to the indication information and send the uplink signal using the transmission parameter and transmission antenna, thereby improving the transmission gain of the uplink signal.

In a second aspect, the disclosure further provides another communication method, including:

determining, by a network device, a sub-band in an uplink resource of a terminal device;

determining, by the network device, indication information of an uplink signal in the sub-band; wherein the indication information indicates a transmission parameter and/or a transmission antenna for the uplink signal;

sending, by the network device, the indication information to the terminal device.

In a possible implementation, determining, by the network device, a sub-band in an uplink resource of a terminal device, includes:

determining, by the network device, a first frequency-domain starting position;

determining, by the network device, the sub-band in the uplink resources according to the first frequency-domain starting position.

In a possible implementation, determining, by the network device, the sub-band according to the first frequency-domain starting position, includes:

determining, by the network device, at least one first sub-band used by the terminal device to transmit the uplink signal in the uplink resource according to the first frequency-domain starting position and a sub-band width; or determining, by the network device, at least one first sub-band used by the terminal device to transmit the uplink signal in a frequency-domain resource allocated for the uplink signal of the terminal device according to the first frequency-domain starting position and a sub-band width; wherein the frequency-domain resource allocated for the uplink signal of the terminal device is included in the uplink resource; or determining, by the network device, at least one first sub-band for transmitting the uplink signal in the uplink resource according to the first frequency-domain starting position, a sub-band width, and a quantity of sub-bands; or determining, by the network device, a plurality of second sub-bands in the uplink resource according to the first frequency-domain starting position.

In a possible implementation, the quantity of sub-bands is larger than one:

a frequency-domain starting position of any one of the sub-bands is obtained as the first frequency-domain starting position plus an offset that is an integer multiple of the sub-band width; or a frequency-domain starting position of each sub-band in the sub-bands except a specified sub-band is obtained as the first frequency-domain starting position plus an offset that is an integer multiple of the sub-band width.

In a possible implementation, the indication information includes control information corresponding to all or a part of second sub-bands in the uplink resource; or the indication information includes control information of the at least one first sub-band; and the control information is indicated respectively for all or a part of the at least one first sub-band; or the indication information includes control information of a specified sub-band; where the specified sub-band is pre-agreed by the network device and the terminal device or determined by the network device.

In a possible implementation, the control information includes one or more of following:

indication information of a precoding matrix, indication information of the number of layers, spatial relation information, indication information of an SRS resource, indication information of a sending antenna, or indication information of an antenna panel.

In a possible implementation, determining, by the network device, at least one first sub-band in the uplink resource, includes:

taking, by the network device, the first frequency-domain starting position as a frequency-domain starting position of a lowest-frequency sub-band, and determining the at least one first sub-band according to the frequency-domain starting position of the lowest-frequency sub-band;

determining, by the network device, a plurality of second sub-bands in the uplink resource, includes:

taking, by the network device, the first frequency-domain starting position as a frequency-domain starting position of a lowest-frequency sub-band, and determining a plurality of second sub-bands in the uplink resource according to the frequency-domain starting position of the lowest-frequency sub-band;

where the first frequency-domain starting position is a starting position of a frequency-domain resource corresponding to the indication information; and the frequency-domain resource corresponding to the indication information is included in a frequency-domain resource of the uplink signal or in the uplink resource.

In a possible implementation, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in frequency-domain resources allocated by the network device for the uplink signal.

In a possible implementation, the method further includes:

receiving, by the network device, an uplink signal sent from the terminal device; wherein the uplink signal is sent from the terminal device according to the transmission parameter and/or using the transmission antenna through a sub-band for transmitting the uplink signal.

In a third aspect, the disclosure provides a communication apparatus, including:

a first determining module configured to determine at least one first sub-band for transmitting an uplink signal in an uplink resource;

a transmission module configured to send the uplink signal according to indication information of the uplink signal sent from a network device and the at least one first sub-band determined, where the indication information indicates a transmission parameter and/or a transmission antenna for the uplink signal.

In a possible implementation, the first determining module is further configured to determine a first frequency-domain starting position, and determine the at least one first sub-band in the uplink resource according to the first frequency-domain starting position.

In a possible implementation, the first determining module is further configured to:

determine a plurality of second sub-bands in the uplink resource according to the first frequency-domain starting position, and determine the at least one first sub-band in the plurality of second sub-bands; or determine a plurality of second sub-bands in the uplink resource according to the first frequency-domain starting position and a sub-band width, and determine the at least one first sub-band in the plurality of second sub-bands; or determine the at least one first sub-band according to the first frequency-domain starting position, a sub-band width, and a frequency-domain resource allocated by the network device for the uplink signal; or determine the at least one first sub-band according to the first frequency-domain starting position, a sub-band width, and a quantity of sub-bands.

In a possible implementation, a frequency-domain starting position of any one of the at least one first sub-band is obtained as the first frequency-domain starting position plus an offset that is an integer multiple of the sub-band width; or a frequency-domain starting position of each sub-band in the at least one first sub-band except a specified sub-band is obtained as the first frequency-domain starting position plus an offset that is an integer multiple of the sub-band width.

In a possible implementation, the first determining module is further configured to:

determine a sub-band corresponding to the frequency-domain resource allocated by the network device for the uplink signal in the plurality of second sub-bands as the at least one first sub-band according to the frequency-domain resource allocated by the network device for the uplink signal; or determine the at least one first sub-band according to an overlapping of the frequency-domain resource allocated by the network device for the uplink signal and the plurality of second sub-bands.

In a possible implementation, the indication information includes control information corresponding to all or a part of second sub-bands included in the uplink resources; or the indication information includes control information of the at least one first sub-band for transmitting the uplink signal; and the control information is indicated respectively for all or a part of the at least one first sub-band; or the indication information includes control information of a specified sub-band; where the specified sub-band is indicated by the network device or pre-agreed by the network device and the terminal device.

In a possible implementation, the control information includes one or more of following:

indication information of a precoding matrix, indication information of the number of layers, spatial relation information, indication information of an SRS resource, indication information of a sending antenna, or indication information of an antenna panel.

In a possible implementation, taking the first frequency-domain starting position as a frequency-domain starting position of a lowest-frequency sub-band, and determining a plurality of second sub-bands in the uplink resource according to the frequency-domain starting position of the lowest-frequency sub-band; or taking the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in a frequency-domain resource of the uplink signal or in the uplink resource.

In a possible implementation, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in frequency-domain resources allocated by the network device for the uplink signal; or the first frequency-domain starting position is a frequency-domain position of a PRB indicated by the network device through signaling.

In a possible implementation, the at least one first sub-band includes a plurality of PRBs;

the PRBs included in the at least one first sub-band are continuous; or the at least one first sub-band includes a sub-band including non-continuous PRBs.

In a possible implementation, the first determining module is further configured to:

determine a transmission parameter and/or a transmission antenna corresponding to the at least one first sub-band according to the indication information;

the transmission module is further configured to transmit the uplink signal according to the transmission parameter and/or using the transmission antenna through the at least one first sub-band.

In a fourth aspect, the disclosure further provides another communication apparatus, including:

a second determining module configured to determine a sub-band in an uplink resource of a terminal device, and determine indication information of an uplink signal in the sub-band; where the indication information indicates a transmission parameter and/or a transmission antenna for the uplink signal;

a sending module configured to send the indication information to the terminal device.

In a possible implementation, the second determining module is further configured to:

determine a first frequency-domain starting position, and determine the sub-band in the uplink resources according to the first frequency-domain starting position.

In a possible implementation, the second determining module is further configured to:

determine at least one first sub-band used by the terminal device to transmit the uplink signal in the uplink resource according to the first frequency-domain starting position and a sub-band width; or determine at least one first sub-band used by the terminal device to transmit the uplink signal in a frequency-domain resource allocated for the uplink signal of the terminal device according to the first frequency-domain starting position and a sub-band width; where the frequency-domain resource allocated for the uplink signal of the terminal device is included in the uplink resource; or determine at least one first sub-band for transmitting the uplink signal in the uplink resource according to the first frequency-domain starting position, a sub-band width, and a quantity of sub-bands; or determine a plurality of second sub-bands in the uplink resource according to the first frequency-domain starting position.

In a possible implementation, the quantity of sub-bands is larger than one:

a frequency-domain starting position of any one of the sub-bands is obtained as the first frequency-domain starting position plus an offset that is an integer multiple of the sub-band width; or a frequency-domain starting position of each sub-band in the sub-bands except a specified sub-band is obtained as the first frequency-domain starting position plus an offset that is an integer multiple of the sub-band width.

In a possible implementation, the indication information includes control information corresponding to all or a part of second sub-bands in the uplink resource; or the indication information includes control information of the at least one first sub-band; and the control information is indicated respectively for all or a part of the at least one first sub-band; or the indication information includes control information of a specified sub-band; where the specified sub-band is pre-agreed by the network device and the terminal device or determined by the network device.

In a possible implementation, the control information includes one or more of following:

indication information of a precoding matrix, indication information of the number of layers, spatial relation information, indication information of an SRS resource, indication information of a sending antenna, or indication information of an antenna panel.

In a possible implementation, taking the first frequency-domain starting position as a frequency-domain starting position of a lowest-frequency sub-band, and determining the at least one first sub-band according to the frequency-domain starting position of the lowest-frequency sub-band; or taking the first frequency-domain starting position as a frequency-domain starting position of a lowest-frequency sub-band, and determining a plurality of second sub-bands in the uplink resource according to the frequency-domain starting position of the lowest-frequency sub-band; or where the first frequency-domain starting position is a starting position of a frequency-domain resource corresponding to the indication information; and the frequency-domain resource corresponding to the indication information is included in a frequency-domain resource of the uplink signal or in the uplink resource.

In a possible implementation, the first frequency-domain starting position is a frequency-domain position of a specified CRB; or the first frequency-domain starting position is a frequency-domain position of a specified Physical Resource Block, PRB, of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in frequency-domain resources allocated by the network device for the uplink signal.

In a possible implementation, the apparatus further includes:

a receiving module configured to receive an uplink signal sent from the terminal device; wherein the uplink signal is sent from the terminal device according to the transmission parameter and/or using the transmission antenna through a sub-band for transmitting the uplink signal.

In a fifth aspect, the disclosure further provides a computer readable storage medium storing a computer program thereon, where the program implements the steps of the method described in the first or second aspect when executed by a processing unit.

In a sixth aspect, the disclosure further provides a communication apparatus, including a processor and a memory, wherein the memory is configured to store computer-executable instructions, and the processor, when executing the computer-executable instructions, causes the apparatus to perform the steps of the method described in the first or second aspect.

Furthermore, the technical effects brought about by any implementation in the second to sixth aspects can refer to the technical effects brought about by different implementations of the first aspect, and will not be repeated here.

Other features and advantages of the disclosure will be described in the following specification, and partly become obvious from the specification or understood by implementing the disclosure. The purpose and other advantages of the disclosure may be realized and obtained by the structures specifically pointed out in the written specification, claims and drawings.

BRIEF DESCRIPTION OF THE DRAWINGS

In order to illustrate the technical solutions in the embodiments of the disclosure more clearly, the accompanying figures which need to be used in the embodiments of the disclosure will be introduced below briefly. Obviously the accompanying figures introduced below are only some embodiments of the disclosure, and other accompanying figures can also be obtained by those ordinary skilled in the art according to these accompanying figures without creative labor.

FIG. 1 shows an architecture diagram of a communication system according to some embodiments of the disclosure.

FIG. 2 shows one of flow charts of a communication method according to some embodiments of the disclosure.

FIG. 3 shows one of flow charts of a communication method according to some embodiments of the disclosure.

FIG. 4 shows one of flow charts of a communication method according to some embodiments of the disclosure.

FIG. 5 shows one of schematic diagrams of sub-bands on uplink resources according to some embodiments of the disclosure.

DETAILED DESCRIPTION

Figure 6:
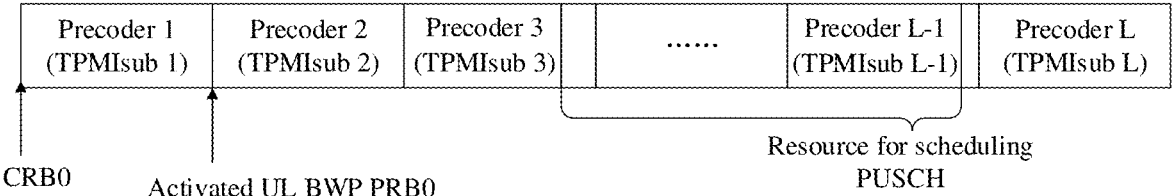
FIG. 6 shows one of schematic diagrams of sub-bands on uplink resources according to some embodiments of the disclosure.

The technical solutions in the disclosure will be described below with reference to the accompanying drawings.

The technical solutions of the embodiments of the disclosure can be applied to various communication systems, for example, an LTE system, a Worldwide Interoperability for Microwave Access (WiMAX) communication system, a future 5th Generation (5G) system such as New Radio Access Technology (NRAT), and future communication systems, such as the 6th Generation (6G) system, etc.

The disclosure will present various aspects, embodiments or features in terms of a system that may include a plurality of devices, components, modules, etc. It should be understood and appreciated that various systems may include additional devices, components, modules, etc., and/or may not include all of the devices, components, modules, etc. discussed with reference to the accompanying drawings. In addition, the combinations of these schemes may also be used.

Furthermore, the word "exemplary" is used to mean serving as an example, instance or illustration in the embodiments of the disclosure. Any embodiment or design scheme described as an "example" in the disclosure should not be construed to be more preferred or advantageous than other embodiments or design schemes. Rather, the use of the word "example" is intended to present the concept in a concrete way.

In the embodiments of the disclosure, the Information, Signal, Message and Channel may sometimes be used interchangeably, It should be noted that their meanings to be expressed are the same when the differences are not emphasized. "Of", "Corresponding, Relevant" and "Corresponding" may sometimes be used interchangeably. It should be noted that their meanings to be expressed are the same when the differences are not emphasized.

The network architectures and service scenarios described in the embodiments of the disclosure are intended to illustrate the technical solutions of the embodiments of the disclosure more clearly, and do not constitute a limitation on the technical solutions provided in the embodiments of the disclosure. As can be known by those ordinary skilled in the art, with the evolution of network architectures and the emergence of new service scenarios, the technical solutions provided in the embodiments of the disclosure are also applicable to similar technical problems.

The embodiments of the disclosure can be applied not only to traditional typical networks, but also to future UE-centric networks. The UE-centric network introduces a non-cell network architecture, that is, a large number of small stations are deployed in a specific area to form a Hyper cell, and each small station is a Transmission Point (TP) or Transmission and Reception Point (TRP) of the Hyper cell and is connected to a centralized controller. When a UE moves within the Hyper cell, the network side device selects a new sub-cluster for the UE to serve it in real time, thereby avoiding the real cell handover and realizing the continuity of UE services. The network side device includes a wireless network device. Alternatively, in the UE-centric network, a plurality of network side devices, such as small stations, may have independent controllers, such as distributed controllers. Each small station can schedule users independently. There is interaction information among the small stations in the long term, to enable them to have certain flexibility in providing cooperative services for UEs.

In order to facilitate understanding the embodiments of the disclosure, a communication system applicable to the embodiments of the disclosure is firstly described in detail by taking the communication system shown in FIG. 1 as an example. FIG. 1 shows a schematic diagram of a communication system applicable to a communication method of an embodiment of the disclosure. As shown in FIG. 1, the communication system 100 includes a network device 102 and a terminal device 106. The network device 102 may be configured with a plurality of antennas, and the terminal device may also be configured with a plurality of antennas. Optionally, the communication system may further include a network device 104, which may also be configured with a plurality of antennas.

It should be appreciated that the network device 102 or network device 104 may also include various components related to signal transmission and reception (e.g., processor, modulator, multiplexer, demodulator or demultiplexer, etc.).

Here, the network device is a device with wireless transceiver function or a chip that can be installed in the device, and the device includes but is not limited to: an evolved Node B (eNB), a Radio Network Controller (RNC), a Node B (NB), a Base Station Controller (BSC), a Base Transceiver Station (BTS), a home base station (for example, home evolved NodeB or Home Node B (HNB)), a Base Band Unit (BBU), an Access Point (AP) in a Wireless Fidelity (WIFI) system, a wireless relay node, a wireless backhaul node, a TRP or TP, etc., or may be a gNB or TRP or TP in a 5G (such as NR) system, one antenna panel or a group of antenna panels (including a plurality of antenna panels) of a base station in the 5G system, or may be a network node constituting a gNB or transmission point, for example, a BBU or a Distributed Unit (DU), etc.

The terminal device may also be referred to as a UE, an access terminal, a user unit, a user station, a mobile radio station, a mobile station, a remote station, a remote terminal, a mobile device, a user terminal, a terminal, a wireless communication device, a user agent, or a user device. The terminal device in the embodiments of the disclosure may be: a mobile phone, a Pad, a computer with wireless transceiver function, a Virtual Reality (VR) terminal, an Augmented Reality (AR) terminal device, a wireless terminal in the industrial control, a wireless terminal in the self driving, a wireless terminal in the remote medical, a wireless terminal in the smart grid, a wireless terminal in the transportation safety, a wireless terminal in the smart city, a wireless terminal in the smart home, etc. The embodiments of the disclosure do not limit the application scenarios. In the disclosure, a terminal device with wireless transceiver function and a chip that can be installed in the above terminal device are collectively referred to as terminal device.

In the communication system 100, both the network device 102 and the network device 104 can communicate with a plurality of terminal devices (e.g., the terminal device 106 shown in the figure). The network device 102 and the network device 104 may communicate with one or more terminal devices similar to the terminal device 106. However, it should be understood that the terminal device that communicates with the network device 102 and the terminal device that communicates with the network device 104 may be the same or different. The terminal device 106 shown in FIG. 1 can communicate with both the network device 102 and the network device 104 at the same time, but this only shows one possible scenario. In some scenarios, the terminal device may only communicate with the network device 102 or the network device 104, which is not limited in the disclosure.

It should be understood that FIG. 1 is only a simplified schematic diagram for easy understanding, and the communication system may also include other network devices or other terminal devices, which are not shown in FIG. 1.

The embodiments of the disclosure will be described in detail below with reference to the accompanying drawings.

It should be understood that the technical solutions of the disclosure may be applied to a wireless communication system, for example, the communication system 100 shown in FIG. 1. The communication system may include at least one network device and at least one terminal device, where the network device and the terminal device may communicate with each other through a wireless air interface. For example, the network devices in the communication system may correspond to the network device 102 and the network device 106 shown in FIG. 1, and the terminal device may correspond to the terminal device 104 shown in FIG. 1.

As shown in FIG. 2, it is a schematic flowchart of a communication method at the terminal device side in an embodiment of the disclosure, which may include the following steps.

Step 201: a terminal device determines at least one first sub-band for transmitting an uplink signal in an uplink resource.

The uplink resource here may be a resource of an uplink BandWidth Part (BWP), or resource of a Component Carrier (CC), or total resources of the uplink, or uplink resources of a serving cell of the uplink signal.

Step 202: the terminal device transmits the uplink signal according to indication information of the uplink signal sent from a network device and the determined at least one first sub-band.

Here, the indication information indicates a transmission parameter and/or a transmission antenna for the uplink signal.

During implementation, the indication information may include a transmission parameter and/or a transmission antenna of all or a part of the first sub-band.

As shown in FIG. 3, it is a flowchart of a communication method on the network device side in an embodiment of the disclosure, which may include the following steps.

Step 301: a network device determines a sub-band in an uplink resource of a terminal device.

It should be noted that the network device may also send the information of the uplink resource to the terminal device through signaling before step 301.

Step 302: the network device determines the indication information of the sub-band for an uplink signal; where the indication information indicates a transmission parameter and/or a transmission antenna for the uplink signal.

During implementation, the network device may determine the indication information of one or more of following the sub-band for the uplink signal.

Step 303: the network device sends the indication information to the terminal device.

During implementation, the network device may send the indication information for respective sub-bands separately, or may carry the indication information of respective sub-bands in the same signaling and send it to the terminal device.

Hereinafter, without loss of generality, the embodiments of the disclosure will be described in detail by taking an interaction process between a terminal device and a network device as an example. The terminal device may be a terminal device that is located in a wireless communication system and has a wireless connection relationship with the network device. It can be understood that the network device may transmit data packets to a plurality of terminal devices having the wireless connection relationship in the wireless communication system based on the same technical solution. This is not limited in the disclosure.

FIG. 4 is an exemplary flowchart of a communication method according to an embodiment of the disclosure from the perspective of device interaction. As shown in FIG. 4, the method may include the following steps.

Step 401: a network device determines a sub-band in an uplink resource of a terminal device.

Step 402: the network device determines the indication information of the sub-band for an uplink signal.

Here, the indication information for the uplink signal may be the information for indicating a transmission parameter of the uplink signal. Alternatively, the indication information of the uplink signal may be the information for indicating a transmission antenna of the uplink signal.

Step 403: the network device sends the indication information for the uplink signal of the terminal device to the terminal device.

During implementation, the network device may also send the resource allocation information of the uplink signal to the terminal device. It should be noted that the network device may send the indication information and the information of the uplink resources to the terminal device at the same time, or the network device may also first send the indication information to the terminal device and then send the information of the uplink resources to the terminal device, or the network device may also first send the information of the uplink resources to the terminal device and then send the indication information to the terminal device.

Step 404: the terminal device determines at least one first sub-band for transmitting the uplink signal in the uplink resource.

It should be noted that it is possible to firstly perform the step 403 and then perform the step 404, or firstly perform the step 404 and then perform the step 403, or perform the step 403 and step 404 simultaneously during implementation, which is not specifically limited in the disclosure.

Step 405: the terminal device transmits the uplink signal according to the received indication information and the determined at least one first sub-band.

In the above method, the terminal device can determine the sub-band for transmitting the uplink signal on the uplink resource allocated by the network device, and transmit the uplink signal with the network device through the determined sub-band, thereby improving the transmission gain of the uplink signal.

Next, a method at the network device side of determining a sub-band in the uplink resource and a method for determining the indication information for the determined sub-band will be introduced. The network device determining a sub-band in uplink resource may include: the network device determining the frequency domain of the sub-band. Here, the implementations may include several following types.

Type 1

The network device determines a plurality of second sub-bands in the uplink resource according to the first frequency-domain starting position.

In a possible implementation, the network device divides the uplink resources into a plurality of second sub-bands according to the first frequency-domain starting position and the sub-band width. The first frequency-domain starting position may be the frequency-domain starting position of a sub-band with the lowest frequency among the plurality of second sub-bands. For example, the uplink resource is Physical Resource Blocks (PRBs) 0-14, the first frequency-domain starting position is 0, and the sub-band width is 5 PRBs. Therefore, the terminal device may divide the uplink resources into a plurality of second sub-bands, which are respectively a sub-band 1: PRB0-PRB4, a sub-band 2: PRB5-PRB9, and a sub-band 3: PRB10-PRB14. After that, the network device determines the indication information of all or a part of the second sub-bands, and sends the indication information to the terminal device, where the indication information includes the control information corresponding to all or a part of the second sub-bands determined by the network device. In addition, the network device sends the frequency-domain resource allocated for the uplink signal of the terminal device to the terminal device.

In another possible implementation, the first frequency-domain starting position may be the starting position of a sub-band with the lowest frequency among the second sub-bands. Then, the network device may determine the frequency-domain starting position of each second sub-band in the uplink resource according to the first frequency-domain starting position and the sub-band width, where the frequency-domain starting position of any one of the second sub-bands is obtained as the first frequency-domain starting position plus an offset that is an integer multiple of the sub-band width; or the frequency-domain starting positions of sub-bands other than a specified sub-band in the second sub-bands are all obtained as the first frequency-domain starting position plus an offset that is an integer multiple of the sub-band width.

After that, the network device determines the indication information of all or a part of the second sub-bands, and sends the indication information to the terminal device, where the indication information includes the control information corresponding to all or a part of the second sub-bands determined by the network device. In addition, the network device sends the frequency-domain resource allocated for the uplink signal of the terminal device to the terminal device. Optionally, the network device sends the indication information respectively for each second sub-band in all or a part of the second sub-bands.

Optionally, the network device determines the first frequency-domain starting position, which means that the network device determines the starting position of the frequency-domain resource corresponding to the indication information of the sub-band. The terminal device can determine the frequency-domain resource corresponding to the indication information of the sub-band according to the first frequency-domain starting position, etc., so as to determine the transmission parameter and/or transmission antenna of the uplink signal corresponding to the frequency-domain resource.

Optionally, the indication information of the uplink signal includes the sub-band indication information, which has a mapping relationship with all or a part of the second sub-bands, and which is the indication information indicating the transmission parameter and/or transmission antenna of the uplink signal using the sub-band. Optionally, each sub-band in all or a part of the second sub-bands has a one-to-one correspondence with the sub-band indication information.

In an embodiment of the disclosure, the frequency-domain resource of the uplink signal may be indicated in the configuration information or scheduling information sent from the network device. For example, the frequency-domain resource for transmitting the uplink signal may be indicated by a frequency-domain resource assignment field in the DCI. For another example, the frequency-domain resource for transmitting the uplink signal may be indicated by the frequency-domain resource allocation signaling (frequencyDomainAllocation) in the RRC signaling. It should be noted that the sub-band size (i.e., the number of frequency-domain resources included in the sub-band, or referred to as the sub-band width) may be predetermined. For example, it is indicated by the network device, or negotiated by the network device and the terminal device, or agreed in a protocol, or determined by the terminal-side device according to a specified rule, which is not specifically limited in the disclosure.

Type 2

The network device determines at least one first sub-band for the terminal device to transmit the uplink signal on the uplink resource according to the first frequency-domain starting position and the sub-band width.

In a possible implementation, the network device divides the uplink resources into a plurality of second sub-bands according to the first frequency-domain starting position and the sub-band width. The first frequency-domain starting position may be the frequency-domain starting position of a sub-band with the lowest frequency among the plurality of second sub-bands. For example, the uplink resource is PRB0-PRB14, the first frequency-domain starting position is 0, and the sub-band width is 5 PRBs. Therefore, the terminal device may divide the uplink resource into a plurality of second sub-bands, which are respectively a sub-band 1: PRB0-PRB4, a sub-band 2: PRB5-PRB9, and a sub-band 3: PRB10-PRB14.

Optionally, the sub-band width may be predetermined, or specified by a protocol, or negotiated with the terminal device.

Optionally, the network device allocates the frequency-domain resource of the uplink signal for the terminal device. The network device determines a sub-band corresponding to the frequency-domain resource among the plurality of second sub-bands as the at least one first sub-band; or the network device determines the overlapping frequency domain resource between the frequency-domain resource of the uplink signal and the plurality of second sub-bands as the at least one first sub-band.

The network device determines the indication information for each first sub-band in all or a part of the at least one first sub-band, and sends the indication information to the terminal device, where the indication information includes the control information corresponding to all or a part of the first sub-bands determined by the network device, and the control information is indicated respectively for all or a part of the first sub-bands. Optionally, the network device sends the indication information respectively for each first sub-band in all or a part of the first sub-bands.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

In another possible implementation, the first frequency-domain starting position may be the starting position of a sub-band with the lowest frequency among the second sub-bands. Then, the network device may determine the frequency-domain starting position of each second sub-band in the uplink resource according to the first frequency-domain starting position and the sub-band width, where the frequency-domain starting position of any one of the second sub-bands is obtained as the first frequency-domain starting position plus an offset that is an integer multiple of the sub-band width; or the frequency-domain starting positions of sub-bands other than a specified sub-band in the second sub-bands are all obtained as the first frequency-domain starting position plus an offset that is an integer multiple of the sub-band width.

After that, the network device allocates the frequency-domain resources of the uplink signal for the terminal device. The network device determines sub-bands corresponding to the frequency-domain resources among the plurality of second sub-bands as the at least one first sub-band; or the network device determines the overlapping frequency domain resource between the frequency-domain resource of the uplink signal and the plurality of second sub-bands as the at least one first sub-band.

After determining the at least one first sub-band, the network device determines the indication information for all or a part of the at least one first sub-band, and sends the indication information to the terminal device. The indication information includes the control information corresponding to all or a part of the first sub-bands determined by the network device, and the control information is indicated respectively for the first sub-bands. Optionally, the network device sends the indication information respectively for each first sub-band in all or a part of the first sub-bands.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

Type 3

The network device determines at least one first sub-band used by the terminal device to transmit the uplink signal on frequency-domain resource allocated for the uplink signal of the terminal device according to the first frequency-domain starting position and the sub-band width; where the frequency-domain resource allocated for the uplink signal of the terminal device is included in the uplink resource.

In a possible implementation, the first frequency-domain starting position may be the starting position of a sub-band with the lowest frequency among the at least one first sub-band. Then, the network device may determine the frequency-domain starting position of each first sub-band on the frequency-domain resources according to the first frequency-domain starting position and the sub-band width. The frequency-domain starting position of any one of the first sub-bands is obtained as the first frequency-domain starting position plus an offset that is an integer multiple of the sub-band width; or the frequency-domain starting positions of sub-bands other than a specified sub-band in the first sub-bands are all obtained as the first frequency-domain starting position plus an offset that is an integer multiple of the sub-band width.

After determining the first sub-bands, the network device determines the indication information for all or a part of the at least one first sub-band, and sends the indication information to the terminal device, wherein the indication information includes the control information corresponding to all or a part of the first sub-bands determined by the network device, and the control information is indicated respectively for the first sub-bands. Optionally, the network device sends the indication information respectively for each first sub-band in all or a part of the first sub-bands.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

In another possible implementation, the network device can determine the quantity of first sub-bands in the frequency-domain resource through the frequency-domain resource of the uplink signal and the sub-band width. The network device may determine the first sub-bands in the frequency-domain resource according to the first frequency-domain starting position, the sub-band width, and the quantity of sub-bands. Optionally, the quantity of first sub-bands may be the same as the quantity of sub-bands, or the quantity of first sub-bands may be less than the quantity of sub-bands.

The sub-band width here may be predetermined, or specified by a protocol, or negotiated with the terminal device.

After determining the first sub-bands, the network device determines the indication information for all or a part of the at least one first sub-band, and sends it to the terminal device. Optionally, the indication information includes the control information corresponding to all or a part of the first sub-bands determined by the network device, and the control information is indicated respectively for the first sub-bands. Optionally, the network device sends the indication information respectively for each first sub-band in all or a part of the first sub-bands.

For example, the frequency-domain resource allocated by the network device for the uplink signal of the terminal device include PRB14-PRB28, and the sub-band width is 4 PRBs, so the network device may determine that the first sub-bands on the frequency-domain resources are respectively a sub-band 1: PRB14-PRB17, a sub-band 2: PRB18-PRB21, a sub-band 3: PRB22-PRB25, and a sub-band 4: PRB26-PRB28. The network device determines the indication information for the sub-band 1 to sub-band 4 respectively, and sends the indication information to the terminal device.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

Type 4

The network device determines at least one first sub-band for the terminal device to transmit the uplink signal on the uplink resource according to the first frequency-domain starting position, the sub-band width and the quantity of sub-bands.

The quantity of sub-bands here may be predetermined, or specified by a protocol, or negotiated with the terminal device. The sub-band width may be predetermined, or may be determined by the network device according to a preset rule, for example, according to the size of the uplink resource. Alternatively, the sub-band width may also be negotiated with the terminal device or agreed in a protocol.

In a possible implementation, the first frequency-domain starting position may be the starting position of a sub-band with the lowest frequency among the at least one first sub-band. Then, the network device may determine the frequency-domain starting position of each first sub-band on the uplink resource according to the first frequency-domain starting position and the sub-band width, where the frequency-domain starting position of any one of the first sub-bands is obtained as the first frequency-domain starting position plus an offset that is an integer multiple of the sub-band width; or the frequency-domain starting positions of sub-bands other than a specified sub-band in the first sub-bands are all obtained as the first frequency-domain starting position plus an offset that is an integer multiple of the sub-band width.

For example, the uplink resource of the terminal device includes PRB0-PRB19, the sub-band width is 5 PRBs, and the quantity of sub-bands is 4. Then the network device can determine that the frequency-domain starting position of the sub-band 1 is PRB0, the frequency-domain starting position of the sub-band 2 is PRB5, the frequency-domain starting position of the sub-band 3 is PRB10 and the frequency-domain starting position of the sub-band 4 is PRB15 according to the first frequency-domain starting position PRB0 and the sub-band width. Then, it is determined that the sub-band 1 is: PRB0-PRB4, the sub-band 2 is: PRB5-PRB9, the sub-band 3 is: PRB10-PRB14, and the sub-band 4 is: PRB15-PRB19.

The network device determines the indication information for all or a part of the at least one first sub-band and sends it to the terminal device. The indication information includes the control information corresponding to the first sub-bands, and the control information is indicated respectively for all or a part of the first sub-bands. Optionally, the network device sends the indication information respectively for each first sub-band in all or a part of the first sub-bands.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

In another possible implementation, the first frequency-domain starting position may be the starting position of a sub-band with the lowest frequency among the at least one first sub-band. Then, the network device may determine each first sub-band in the uplink resource according to the first frequency-domain starting position, the sub-band width, and the quantity of sub-bands.

For example, the uplink resource of the terminal device includes PRB0-PRB19, the sub-band width is 5 PRBs, and the quantity of sub-bands is 4. Then the network device can determine that the sub-bands in the uplink resource are respectively a sub-band 1: PRB0-PRB4, a sub-band 2: PRB5-PRB9, a sub-band 3: PRB10-PRB14, and a sub-band 4: PRB15-PRB19.

The network device determines the indication information for all or a part of the at least one first sub-band and sends the indication information to the terminal device. The indication information includes the control information corresponding to the first sub-bands, and the control information is indicated respectively for all or a part of the first sub-bands. Optionally, the network device sends the indication information respectively for each first sub-band in all or a part of the first sub-bands.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

In an embodiment of the disclosure, the control information includes one or more of following: the indication information of a precoding matrix, the indication information of the number of layers, the spatial relation information, the indication information of SRS resource, the indication information of a sending antenna, or the indication information of an antenna panel.

Optionally, the indication information of the uplink signal includes the sub-band indication information, which has a mapping relationship with the at least one first sub-band, and which is the indication information indicating the transmission parameter and/or transmission antenna of the uplink signal using the sub-band. Optionally, this mapping relationship is a one-to-one correspondence.

With the above method 1 to method 4, the network device can determine the sub-band in the uplink resource and send the indication information determined for the determined sub-band to the terminal device, so that the terminal device can transmit the uplink signal through the sub-band according to the indication information, improving the transmission gain of the uplink signal.

After the method at the network device side of determining the sub-band in the uplink resources and to determine the indication information for the determined sub-band is introduced, a method at the terminal device side of determining at least one first sub-band for transmitting the uplink signal in the uplink resources will be introduced below.

Here, the terminal device determines at least one first sub-band for transmitting the uplink signal in uplink resource, which may include: the terminal device determines the sub-band size of the at least one first sub-band, the terminal device determines the quantity of the at least one first sub-band, and the terminal device determines one or more frequency-domain positions of the at least one first sub-band.

In an implementation, the terminal device determines the at least one first sub-band in uplink resource, which may include: determining a frequency-domain position of the at least one first sub-band. During implementation, the terminal device may determine a first frequency-domain starting position in the uplink resource, and determine the frequency-domain position of the at least one first sub-band according to the first frequency-domain starting position. The first frequency-domain starting position is a frequency-domain starting position used to determine the at least one first sub-band.

The specific implementations may include the following methods.

Method 1

The terminal device may determine a plurality of second sub-bands in the uplink resource according to the first frequency-domain starting position, and determine the at least one first sub-band in the plurality of second sub-bands.

In a possible implementation, the terminal device firstly determines a plurality of second sub-bands in the uplink resource according to the first frequency-domain starting position. The uplink resource here may be a resource of an uplink BWP, or a resource of a CC, or total uplink resource, or uplink resources of a serving cell of the uplink signal. The first frequency-domain starting position may be the frequency-domain starting position of a sub-band with the lowest frequency among the plurality of second sub-bands. After determining the plurality of second sub-bands in the uplink resource, the terminal device may determine sub-bands corresponding to the frequency-domain resources for transmitting the uplink signal in the plurality of second sub-bands as the at least one first sub-band according to the frequency-domain resources for transmitting the uplink signal allocated by the network device for the uplink signal.

Optionally, the terminal receives the indication information sent from the network device for all or a part of the second sub-bands, where the indication information includes the control information corresponding to all or a part of the second sub-bands determined by the network device. Optionally, the network device sends the indication information respectively for each second sub-band in all or a part of the second sub-bands. The terminal may determine the transmission parameters and/or transmission antennas of the uplink signals corresponding to all or a part of the second sub-bands according to the first frequency-domain starting position. Further, the transmission parameter and/or transmission antenna of the uplink signal on the at least one sub-band is/are determined according to the transmission parameters and/or transmission antennas of the uplink signals corresponding to these frequency-domain resource.

For example, an uplink BWP includes 20 PRBs, and the terminal divides these 20 PRBs into 4 sub-bands, which are respectively a sub-band 1: PRBs 0-4, a sub-band 2: PRBs 5-9, a sub-band 3: PRBs 10-14, and a sub-band 4: PRBs 15-19 (wherein PRB x represents a PRB labeled as x, which is only for illustration). If the frequency-domain resource allocated by the network device for the uplink signal is PRBs 4-13, then these PRBs overlap with the sub-bands 2, 3 and 4, and the terminal determines that the at least one first sub-band includes 3 sub-bands, which are respectively the sub-band 2: PRBs 5-9, sub-band 3: PRBs 10-14, and sub-band 4: PRBs 15-19. Another determination method is that the overlapping part of the frequency-domain resource allocated by the network device for the uplink signal and the sub-bands into which the uplink resources are divided is the at least one first sub-band. For example, an uplink BWP includes 20 PRBs, and the terminal divides these 20 PRBs into 4 sub-bands, which are respectively a sub-band 1: PRBs 0-4, a sub-band 2: PRBs 5-9, a sub-band 3: PRBs 10-14, and a sub-band 4: PRBs 15-19 (where PRB x represents a PRB labeled as x, which is only for illustration). If the frequency-domain resources allocated by the network device for the uplink signal are PRBs 4-13, then these PRBs overlap with the sub-bands 2, 3 and 4, and the overlapping parts are respectively PRB 4, PRBs 5-9 and PRBs 10-13, so the terminal determines that the at least one first sub-band includes 3 sub-bands, which are respectively a sub-band composed of PRB 4, a sub-band composed of PRBs 5-9, and a sub-band composed of PRBs 10-13.

For another example, the uplink resource allocated by the network device for the terminal device includes PRB0-PRB28, and the sub-band width is 5 PRBs. The terminal device determines that the frequency-domain starting position of the sub-band with the lowest frequency is PRB4, and the sub-band width is 5 PRBs, so the terminal device divides the uplink resources into 5 sub-bands, where PRB4-PRB8 belong to sub-band 1, PRB9-PRB13 belong to sub-band 2, PRB14-PRB18 belong to sub-band 3, PRB19-PRB23 belong to sub-band 4, and PRB24-PRB28 belong to sub-band 5.

The frequency-domain resources for transmitting uplink signals sent from the network device to the terminal device are PRB6-PRB18, and then the terminal device may determine that at least one first sub-band for transmitting the uplink signal is the sub-band 1, sub-band 2 and sub-band 3.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

The terminal may determine the transmission parameters and/or transmission antennas of the uplink signal using the frequency-domain resource corresponding to these sub-bands according to a correspondence between the sub-band indication information and sub-bands. Further, the transmission parameter and/or transmission antenna of the uplink signal using the at least one sub-band is/are determined according to the transmission parameters and/or transmission antennas of the uplink signal corresponding to these frequency-domain resource.

Method 2

The terminal device determines the at least one first sub-band according to the first frequency-domain starting position, the sub-band width, and the quantity of the at least one first sub-band.

In a possible implementation, the indication information may include the control information corresponding to at least one first sub-band for transmitting the uplink signal. Optionally, the terminal device may determine the quantity of the at least one first sub-band according to the control information included in the indication information. For example, the bit width of the control information is proportional to the quantity of the at least one first sub-band, and the terminal can determine the quantity of the at least one first sub-band according to the bit width of the control information. The terminal device determines the frequency-domain starting position of the sub-band with the lowest frequency in the uplink resource according to the first frequency-domain starting position, and determines at least one first sub-band for transmitting the uplink signal in the uplink resource according to the sub-band width and the quantity of the at least one first sub-band.

Optionally, the terminal determines the transmission parameter and/or the transmission antenna of the uplink signal using the at least one sub-band according to the first frequency-domain starting position.

It should be noted that the sub-band width may be predetermined according to the empirical value, or may be indicated by the network device, or may be negotiated between the network device and the terminal device, which is not specifically limited in the disclosure. In addition, the at least one first sub-band may have the identical sub-band width.

Optionally, the sub-band width is the sub-band width of the at least one first sub-band (that is, the size of the frequency-domain resource occupied by the sub-band). For example, assuming that the sub-band width is 4 PRBs, the quantity of the at least one first sub-band is 4 and the first frequency-domain starting position is PRB 7, the terminal may determine the at least one first sub-band for transmitting the uplink signal as a sub-band 1: PRB7-PRB10, a sub-band 2: PRB11-PRB14, a sub-band 3: PRB15-PRB18, and a sub-band 4: PRB19-PRB22, respectively. This is independent of the uplink resource allocated by the network device for the uplink signal.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

The terminal may determine the transmission parameter and/or the transmission antenna of the uplink signal using the at least one sub-band according to a correspondence between the sub-band indication information and sub-bands.

In another possible implementation, the terminal device determines the sub-band starting position of the at least one first sub-band according to the first frequency-domain starting position, where the first frequency-domain starting position may be the frequency-domain starting position of the sub-band with the lowest frequency in the first sub-bands. The terminal device firstly determines the size of one sub-band, and the frequency-domain starting position of any one of the at least one first sub-band is obtained as the first frequency-domain starting position plus an offset that is an integer multiple of the sub-band size. The first frequency-domain starting position is indicated by Ns, so the frequency-domain starting position of any one of the at least one first sub-band is Ns+M*Nsub, where M and Nsub respectively indicate the quantity of the at least one first sub-band and the sub-band size firstly determined by the terminal, and M is a positive integer.

Alternatively, the terminal device firstly determines the size of one sub-band, and the frequency-domain starting positions of sub-bands other than a specified sub-band (for example, the sub-band at the first place) in the at least one first sub-band are all obtained as the first frequency-domain starting position plus an offset that is an integer multiple of the sub-band size. Optionally, the frequency-domain starting position of the sub-band at the first place is equal to the starting position of the frequency-domain resources allocated by the network device for the uplink signal. Optionally, the frequency-domain ending position of the last sub-band is the position of the last one of the frequency-domain resources allocated by the network device for the uplink signal.

Here, the specified sub-band may be pre-agreed between the terminal device and the network device, or may be agreed in a protocol, or may be obtained through negotiation between the terminal device and the network device, or may be determined by the terminal device according to an agreed rule. In addition, the specified sub-band may also be indicated by the network device.

Optionally, the indication information of the uplink signal includes the sub-band indication information, which has a mapping relationship with all or a part of the at least one first sub-band and which is the indication information indicating the transmission parameter and/or transmission antenna of the uplink signal using the sub-band. Optionally, each sub-band in all or a part of the at least one first sub-band has a one-to-one correspondence with the sub-band indication information.

The terminal may determine the transmission parameter and/or the transmission antenna of the uplink signal using the at least one sub-band according to a correspondence between the sub-band indication information and sub-bands.

In an embodiment of the disclosure, the frequency-domain resource for transmitting the uplink signal may be indicated in the configuration information or scheduling information sent from the network device. For example, the frequency-domain resource for transmitting the uplink signal may be indicated by a frequency-domain resource assignment field in the DCI. For another example, the frequency-domain resource for transmitting the uplink signal may be indicated by the frequency-domain resource allocation signaling (Frequency Domain Allocation) in the RRC signaling. It should be noted that the sub-band size (that is, the number of frequency-domain resources included in the sub-band, or called the sub-band width) may be predetermined according to the empirical value, or may be indicated by the network device, or may be negotiated by the network device and the terminal device, etc.

Method 3

The terminal device determines the at least one first sub-band according to the first frequency-domain starting position, the sub-band width, and the frequency-domain resource allocated by the network device for the uplink signal.

In a possible implementation, the terminal device determines the at least one first sub-band according to the first frequency-domain starting position and the sub-band width. Optionally, the first frequency-domain starting position is the frequency-domain starting position of the sub-band with the lowest frequency in the at least one first sub-band.

Optionally, the sub-band size here is the sub-band size configured by the network device for the uplink signal but not the actual size of the at least one first sub-band. For example, the sub-band size configured by the network device for a PUSCH is 4 PRBs, but the frequency-domain resource allocated for the PUSCH are 18 PRBs. Assuming that the first frequency-domain starting position is the starting position NO of the frequency-domain resource allocated by the network side for the PUSCH, one possibility is that the at least one first sub-band includes 5 sub-bands, where the size of 1 sub-band is 2 PRBs, and the size of 4 sub-bands is 4 PRBs.

Optionally, the size of any one of the at least one first sub-band is the same as the size of the sub-band configured by the network device for the uplink signal. In this case, the frequency-domain resource allocated by the base station for the uplink signal need to be an integer multiple of the sub-band size.

In another possible implementation, the terminal device determines the at least one first sub-band according to the first frequency-domain starting position and the quantity of sub-bands (or referred to as the number of sub-bands), where the first frequency-domain starting position may be the frequency-domain starting position of the sub-band with the lowest frequency in the first sub-bands. The quantity of sub-bands may be indicated by the network side device to the terminal device, or determined by the terminal according to a predefined rule, or pre-agreed by the network side device and the terminal (e.g., stipulated by a protocol). Optionally, the terminal device determines the at least one first sub-band according to a predefined rule. For example, assuming that the quantity of sub-bands is 3 and the frequency-domain resource allocated by the network device for one PUSCH are 18 PRBs, then the terminal determines that the number of PRBs in each sub-band is 18/3=6, while the PRBs included in each sub-band are continuous, then the specific frequency-domain positions of the three sub-bands can be determined according to the first frequency-domain starting position.

Optionally, the first frequency-domain starting position is the starting position of the frequency-domain resource corresponding to the indication information, where the frequency-domain resource corresponding to the indication information is included in the frequency-domain resource of the uplink signal. For example, the frequency-domain resource corresponding to the indication information is PRB12-PRB21, and the first frequency-domain starting position is PRB12.

For another example, the frequency-domain resource of the uplink signal of the terminal device is PRB0-PRB24, and the frequency-domain resource corresponding to the indication information is PRB5-PRB8, so the terminal device determines that the first frequency-domain starting position is PRB5. The terminal determines at least one first sub-band in the frequency-domain resource for the uplink signal according to the determined first frequency-domain starting position and the width sub-band, which are respectively a sub-band 1: PRB5-PRB9, a sub-band 2: PRB10-PRB14, a sub-band 3: PRB15-PRB19, and a sub-band 4: PRB20-PRB24.

Optionally, the quantity of sub-bands is determined by the terminal device according to the number of resources included in the frequency-domain resources allocated by the network device for the uplink signal and the sub-band width included in each sub-band. The quantity of sub-bands is equal to an upward rounded integer for the numerical value obtained after dividing the number of resources included in the frequency-domain resources allocated by the network device for the uplink signal by the number of frequency-domain resources included in each sub-band.

Optionally, the quantity of sub-bands is the quantity of the at least one first sub-band.

Optionally, there is a mapping relationship between the at least one first sub-band and the indication information of the uplink signal. This mapping relationship may be pre-agreed or indicated by the network device to the terminal.

Optionally, when the at least one first sub-band includes a plurality of second sub-bands, the indication information of the uplink signal includes the indication information for all or a part of the plurality of second sub-bands. Optionally, the indication information of the uplink signal is indicated respectively for each sub-band in all or a part of the second sub-bands. That is, different information may be indicated for different sub-bands.

Optionally, the indication information of the uplink signal includes the sub-band indication information, which has a mapping relationship with the at least one first sub-band, and which is the indication information indicating the transmission parameter and/or transmission antenna of the uplink signal using the sub-band. Optionally, each sub-band in all or a part of the at least one first sub-band has a one-to-one correspondence with the sub-band indication information.

The terminal may determine the transmission parameter and/or the transmission antenna of the uplink signal using the at least one sub-band according to a correspondence between the sub-band indication information and sub-bands.

Method 4

The terminal device determines a plurality of second sub-bands in the uplink resource according to the first frequency-domain starting position and the sub-band width, and determines the at least one first sub-band in the plurality of second sub-bands.

In a possible implementation, the first frequency-domain starting position is the frequency-domain starting position of a sub-band with the lowest frequency among the plurality of second sub-bands. The terminal device determines the frequency-domain starting position of each second sub-band in the uplink resource according to the first frequency-domain starting position and the sub-band width, where the frequency-domain starting position of any one of the second sub-bands is obtained as the first frequency-domain starting position plus an offset that is an integer multiple of the sub-band width; or the frequency-domain starting positions of sub-bands other than a specified sub-band in the second sub-bands are all obtained as the first frequency-domain starting position plus an offset that is an integer multiple of the sub-band width. Then, the terminal device may determine a plurality of second sub-bands in the uplink resource according to the frequency-domain starting position of each second sub-band and the sub-band width.

For example, the uplink resources of the terminal device include PRB0-PRB19, and the sub-band width is 5 PRBs. Then, the terminal device may determine that the frequency-domain starting positions of the second sub-bands in the uplink resource are PRB0, PRB5, PRB10 and PRB15, respectively. Thus the terminal device may determine that the sub-bands in the uplink resource are respectively a sub-band 1: PRB0-PRB4, a sub-band 2: PRB5-PRB9, a sub-band 3: PRB10-PRB14, and a sub-band 4: PRB15-PRB19.

The terminal device then determines at least one first sub-band for transmitting the uplink signal among the plurality of second sub-bands according to the frequency-domain resource of the uplink signal allocated by the network device, where the terminal device determines sub-bands corresponding to the frequency-domain resource among the plurality of second sub-bands as the at least one first sub-band according to the frequency-domain resource allocated by the network device for the uplink signal; or, the terminal device determines the at least one first sub-band according to the overlapping of the frequency-domain resource allocated by the network device for the uplink signal and the plurality of second sub-bands.

In another possible implementation, the first frequency-domain starting position is the frequency-domain starting position of a sub-band with the lowest frequency among the plurality of second sub-bands. The terminal device may calculate the quantity of second sub-bands in the uplink resource according to the uplink resource and the sub-band width. Then, the terminal device determines a plurality of second sub-bands in the uplink resource according to the first frequency-domain starting position, the sub-band width and the quantity of sub-bands. The terminal device then determines at least one first sub-band for transmitting the uplink signal among the plurality of second sub-bands according to the frequency-domain resource of the uplink signal allocated by the network device, where the terminal device determines sub-bands corresponding to the frequency-domain resource among the plurality of second sub-bands as the at least one first sub-band according to the frequency-domain resources allocated by the network device for the uplink signal; or, the terminal device determines the at least one first sub-band according to the overlapping of the frequency-domain resources allocated by the network device for the uplink signal and the plurality of second sub-bands.

For example, the uplink resource of the terminal device includes PRB0-PRB19, and the sub-band width is 5 PRBs. The terminal device may calculate the quantity of sub-bands as 5 according to the PRBs included in the uplink resource and the sub-band width. Then the terminal device may determine that the sub-bands in the uplink resource are respectively a sub-band 1: PRB0-PRB4, a sub-band 2: PRB5-PRB9, a sub-band 3: PRB10-PRB14, and a sub-band 4: PRB15-PRB19.

With the above method 1 to method 4, the terminal device can determine the first sub-bands for transmitting the uplink signal in the uplink resource and transmit the uplink signal through the first sub-bands according to the indication information corresponding to the first sub-bands, thereby improving the transmission gain of the uplink signal.

After how the terminal device determines at least one first sub-band for transmitting the uplink signal in the uplink resource is described, the frequency-domain starting position proposed in the technical solution of the disclosure will be described below. The first frequency-domain starting position proposed in the embodiments of the disclosure may be the following cases 1-8.

Case 1: the frequency-domain starting position is a specified Common Resource Block (CRB).

For example, it may be a subcarrier 0 of CRB0.

Optionally, if the starting positions of subcarriers correspond to different CRBs, the aforementioned frequency-domain starting position is the subcarrier 0 of the CRB0 where the subcarrier for transmitting the uplink signal is located.

Optionally, if the starting positions of subcarriers correspond to different CRBs, the aforementioned frequency-domain starting position is the subcarrier 0 of the CRB0 where the subcarrier used by the terminal device when receiving the frequency-domain resource for transmitting the uplink signal sent from the network device is located.

Case 2: the frequency-domain starting position is a specified PRB of the initial uplink BWP.

For example, it may be a PRB0, a PRB1, etc. of the initial uplink.

Optionally, the frequency-domain starting position may also be a specified subcarrier of a specified PRB of the initial uplink. For example, it may be the subcarrier 0 of the PRB0 of the initial uplink bandwidth part.

Case 3: the frequency-domain starting position is a specified PRB in the uplink BWP for transmitting the uplink signal.

For example, it may be the PRB with the smallest serial number, such as PRB0, in the BWP for transmitting the uplink signal.

Optionally, the frequency-domain starting position may also be a specified subcarrier of a specified PRB of the BWP for transmitting the uplink signal. For example, it may be the subcarrier 0 of the PRB0 of the BWP for transmitting the uplink signal.

Case 4: the frequency-domain starting position is a specified PRB in the BWP for transmitting the scheduling information of the uplink signal; where the scheduling information indicates the frequency-domain resources for the terminal device to transmit the uplink signal.

For example, the frequency-domain starting position may be the PRB with the smallest serial number, such as PRB0, in the BWP used when transmitting the scheduling information.

Optionally, the frequency-domain starting position may also be a specified subcarrier of a specified PRB, such as subcarrier 0 of PRB0, in the BWP used when transmitting the scheduling information.

Case 5: the frequency-domain starting position is a specified PRB in the BWP for transmitting the indication information.

For example, the frequency-domain starting position may be the PRB with the smallest serial number, such as PRB0, in the BWP for transmitting the indication information.

Optionally, the frequency-domain starting position may also be a specified subcarrier of a specified PRB, such as subcarrier 0 of PRB0, in the BWP for transmitting the indication information.

Case 6: the frequency-domain starting position is a specified PRB in a specified BWP.

For example, it may be the PRB with the smallest serial number, such as PRB0, in the specified BWP.

Optionally, the frequency-domain starting position may also be a specified subcarrier of a specified PRB, such as subcarrier 0 of PRB0, in the specified BWP.

In a possible implementation, the specified BWP may be indicated by the network device through signaling. For example, the network device may indicate the specified BWP through the RRC signaling, Media Access Control (MAC) signaling or DCI.

In another possible implementation, the specified BWP may be reported by the terminal device to the network device.

Case 7: the frequency-domain starting position is a specified PRB in the uplink resource.

For example, it may be the PRB0 or PRB10 or the like in the uplink resource.

Optionally, the frequency-domain starting position may also be a specified subcarrier of a specified PRB, such as subcarrier 0 of PRB0, in the uplink resource.

Case 8: the frequency-domain starting position is a PRB indicated by the network device through signaling.

Here, the network device may indicate the frequency-domain starting position through the RRC signaling, MAC signaling or DCI. For example, the frequency-domain starting position may be indicated as PRB0 or PRB3, etc.

Optionally, the first frequency-domain starting position is a frequency-domain position appointed by the network device and the terminal device.

Optionally, the first frequency-domain starting position is a frequency-domain starting position indicated by the network device to the UE.

Optionally, the network device indicates a method for determining the first frequency-domain starting position to the UE, and the UE determines the first frequency-domain starting position according to this method.

It should be noted that the PRBs included in each sub-band may be continuous for the plurality of second sub-bands or for the at least one first sub-band. Alternatively, a sub-band including non-continuous PRBs exists in the plurality of second sub-bands or at least one first sub-band.

Hereinafter, the plurality of second sub-bands are taken as an example for illustration without loss of generality. For example, the uplink resource of the terminal device allocated by the network device is PRB0-PRB10 and PRB22-PRB35. The terminal device divides the uplink resource into a plurality of second sub-bands, which are respectively a sub-band 1: PRB0-PRB4, a sub-band 2: PRB5-PRB9, a sub-band 3: PRB10 and PRB22-PRB25, a sub-band 4: PRB26-PRB30, and a sub-band 5: PRB31-PRB35. It can be understood that the PRBs included in the sub-band 3 among the plurality of second sub-bands are discontinuous, while the PRBs included in each of the sub-band 1, the sub-band 2, the sub-band 4 and the sub-band 5 are continuous.

For another example, the uplink resources of the terminal device allocated by the network device are PRB0-PRB14. The terminal device divides the uplink resources into a plurality of second sub-bands, which are respectively a sub-band 1: PRB0-PRB4, a sub-band 2: PRB5-PRB9, and a sub-band 3: PRB10-PRB14. It can be understood that the PRBs included in the sub-band 1 to the sub-band 3 among the plurality of second sub-bands are all continuous.

Optionally, for the plurality of second sub-bands or for the at least one first sub-band, the Virtual Resource Blocks (VRBs) included in each sub-band may be continuous, while the PRBs corresponding to the VRBs may be continuous or discontinuous. For example, a sub-band includes a plurality of continuous VRBs. When these VRBs are mapped to PRBs, the PRBs may be discontinuous.

Next, a method for transmitting an uplink signal according to the indication information through a sub-band determined on uplink resources in an embodiment of the disclosure will be further introduced by way of specific embodiments.

Embodiment 1

As shown in FIG. 5, the horizontal axis represents uplink resources (PRB); TPMIsub 1, TPMIsub 2, . . . , TPMIsub L each corresponds to a precoder of a sub-band (such as sub-band 1, sub-band 2, . . . sub-band L) and a Transmitted Precoding Matrix Indicator field(s) in the control information included in the indication information, and their values may be the same or different. The frequency-domain starting position of the sub-band with the lowest frequency indicated by the indication information is the subcarrier 0 of the common resource block 0, and each sub-band corresponds to a plurality of continuous PRBs. The UE may determine a plurality of second sub-bands in the uplink resource according to the indication information and the sub-band width. In this embodiment, the indication information of sub-bands (precoding matrix indicator) corresponds to the second sub-bands one by one. According to the correspondence between the indication information of sub-bands and the second sub-bands, the terminal may determine a precoding matrix of each PRB of the uplink resource and thus determine the precoding matrix of each of at least one first sub-band for transmitting the uplink signal. Then the precoding matrix used for Physical Uplink Shared CHannel (PUSCH) transmission is the precoding matrix corresponding to the sub-band where each PRB for transmitting the uplink signal in the PUSCH is located.

It should be noted that all the sub-bands have the same sub-band width in FIG. 5, but it can be understood that the sub-band widths of all the sub-bands in the communication method provided by the embodiments of the disclosure may be the same or different.

Embodiment 2

As shown in FIG. 6, the horizontal axis represents uplink resources (PRB); TPMIsub 1, TPMIsub 2, . . . , TPMIsub L each corresponds to a precoder of a sub-band (such as sub-band 1, sub-band 2, . . . sub-band L) and a Transmitted Precoding Matrix Indicator field(s) in the control information included in the indication information, and their values may be the same or different. The terminal device determines the frequency-domain starting position (first frequency-domain starting position) of the sub-band with the lowest frequency as the subcarrier 0 of the PRB0 of the activated BWP, and each sub-band corresponds to a plurality of continuous PRBs. In this embodiment, the indication information of sub-bands (precoding matrix indicator) corresponds to the second sub-bands one by one. The terminal device may determine a plurality of second sub-bands in the uplink resource according to the first frequency-domain starting position and the sub-band width (the terminal device may also determine the second sub-bands based on the quantity of second sub-bands or the bandwidth of the BWP). According to the correspondence between the indication information of sub-bands and the second sub-bands, the terminal may determine a precoding matrix of each PRB of the uplink resource and thus determine the precoding matrix of at least one first sub-band for transmitting the uplink signal. Then the precoding matrix used for PUSCH transmission is the precoding matrix corresponding to the sub-band where each PRB for transmitting the uplink signal in the PUSCH is located.

Optionally, the BWP in FIG. 6 is a BWP for transmitting the PUSCH. Alternatively, the BWP in FIG. 6 is an uplink activated BWP when the PUSCH is scheduled. Alternatively, the BWP in FIG. 6 is an uplink activated BWP when the indication information is sent.

Optionally, the BWP in FIG. 6 is a specified BWP, which is known in advance, for example, indicated by the network device to the terminal device through signaling. Alternatively, the specified BWP is reported by the terminal device to the base station through signaling.

It should be noted that all the sub-bands have the same sub-band width in FIG. 6, but it can be understood that the sub-band widths of all the sub-bands in the communication method provided by the embodiments of the disclosure may be the same or different.

Embodiment 3

Figure 7:
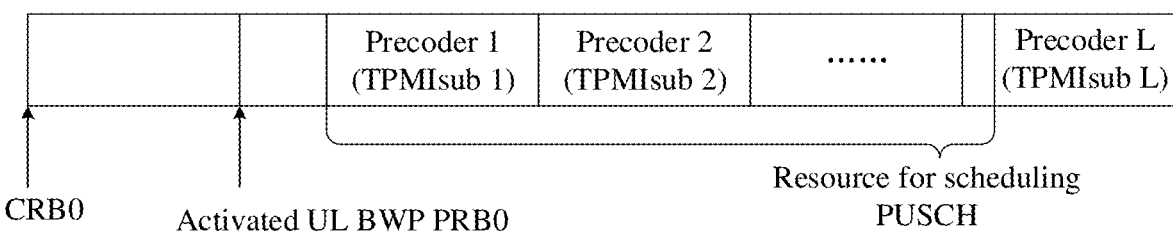
FIG. 7 shows one of schematic diagrams of sub-bands on uplink resources according to some embodiments of the disclosure.

As shown in FIG. 7, the horizontal axis represents uplink resources (PRB); TPMIsub 1, TPMIsub 2, . . . , TPMIsub L each corresponds to a precoder of a sub-band (such as sub-band 1, sub-band 2, . . . sub-band L) and a Transmitted Precoding Matrix Indicator field(s) in the control information included in the indication information, and their values may be the same or different. The first frequency-domain starting position is the frequency-domain starting position of the sub-band with the lowest frequency in the second sub-bands. It is assumed that the first frequency-domain starting position is the lowest-numbered PRB in the frequency-domain resources for transmitting the uplink signal in the PUSCH, and each sub-band corresponds to a plurality of continuous PRBs. In this embodiment, the indication information of sub-bands (precoding matrix indicator) corresponds to the second sub-bands one by one. The terminal device may determine a plurality of second sub-bands according to the first frequency-domain starting position and the sub-band width of each sub-band, and determine the precoding matrices of the PRBs corresponding to the plurality of second sub-bands according to the precoding matrix indicator of sub-bands. The first sub-band is the overlapping PRB of the second sub-band and the frequency-domain resource for transmitting the uplink signal in the PUSCH. In this embodiment, the $m^{th}$ first sub-band is the same as the $m^{th}$ second sub-band, where m is less than L, and the $L^{th}$ first sub-band is a part of the $L^{th}$ second sub-band. Then the terminal may determine a precoding matrix corresponding to at least one first sub-band, and the precoding matrix used for PUSCH transmission is the precoding matrix corresponding to the sub-band where each PRB for transmitting the uplink signal in the PUSCH is located.

It should be noted that all the sub-bands have the same sub-band width in FIG. 7, but it can be understood that the sub-band widths of all the sub-bands in the communication method provided by the embodiments of the disclosure may be the same or different.

Embodiment 4

Figure 8:
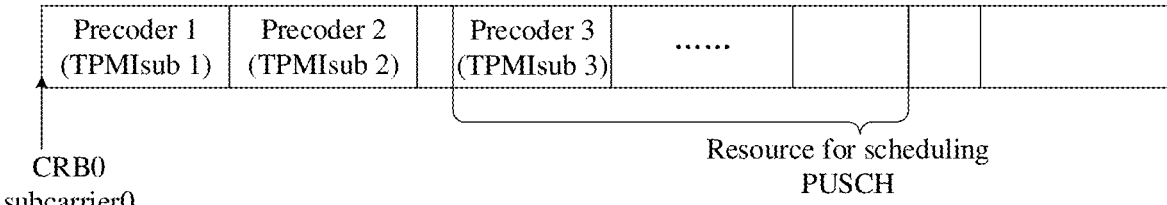
FIG. 8 shows one of schematic diagrams of sub-bands on uplink resources according to some embodiments of the disclosure.

The terminal device cannot determine the sub-band precoder information of all PRBs for transmitting uplink signals in the PUSCH according to an instruction from the network device. For these PRBs, the terminal device may determine their precoder information according to the sub-band precoder information previously indicated by the network device, or use the wideband precoder as its precoder. As shown in FIG. 8, the first frequency-domain starting position is the frequency-domain starting position of the sub-band with the lowest frequency in the second sub-bands. It is assumed that the first frequency-domain starting position is the subcarrier 0 of the CRB 0, and the sub-band precoding matrix indicators correspond with the second sub-bands in a one-to-one manner. The terminal device can only determine the sub-band precoding matrices of three second sub-bands, so the terminal device can only determine the precoder of the sub-bands where a part of PRBs for transmitting uplink signals in the PUSCH are located, and the terminal device needs to determine the precoder of other PRBs in other ways. For example, the wideband precoder may be used.

Embodiment 5

Figure 9:
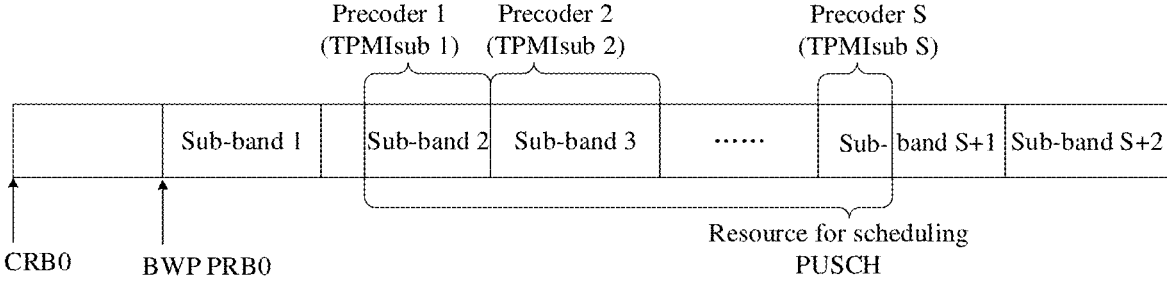
FIG. 9 shows one of schematic diagrams of sub-bands on uplink resources according to some embodiments of the disclosure.

As shown in FIG. 9, the horizontal axis represents uplink resources (PRB); TPMIsub 1, TPMIsub 2, . . . , TPMIsub S each corresponds to a precoder of a sub-band (such as sub-band 1, sub-band 2, . . . sub-band S) and a Transmitted Precoding Matrix Indicator field(s) in the control information included in the indication information, and their values may be the same or different. The uplink resource include a plurality of second sub-bands, where the first frequency-domain starting position of the second sub-bands (the frequency-domain starting position of the sub-band with the lowest frequency among the second sub-bands) is the sub-carrier 0 of the PRB0 of the initial BWP. Each sub-band includes several continuous PRBs, and each sub-band has the same sub-band width.

The indication information sent from the network device indicates a precoding matrix of at least one first sub-band for transmitting a PUSCH. The first frequency-domain starting position of the first sub-bands (the frequency-domain starting position of the sub-band with the lowest frequency among the first sub-bands) is the lowest frequency-domain position allocated for the PUSCH frequency-domain resource. In this embodiment, the first sub-bands have a one-to-one correspondence with the precoding matrix indicators (control information) of sub-bands. The terminal device may determine the precoding matrix of each first sub-band according to the control information, that is, may determine the precoder of each PRB for transmitting the uplink signal. The terminal may transmit the PUSCH using these precoding matrices.

Here, the BWP may be a BWP where the PUSCH is located.

Embodiment 6

Figure 10:
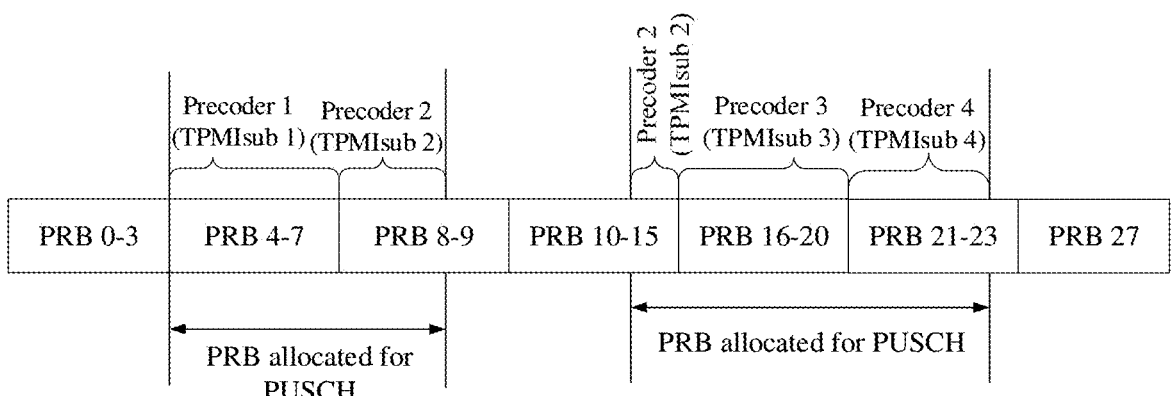
FIG. 10 shows one of schematic diagrams of sub-bands on uplink resources according to some embodiments of the disclosure.

As shown in FIG. 10, the horizontal axis represents uplink resources; TPMIsub 1, TPMIsub 2, TPMIsub 3 and TPMIsub 4 each corresponds to a precoder of a sub-band (sub-band 1, sub-band 2, sub-band 3 and sub-band 4) and a Transmitted Precoding Matrix Indicator field(s) in the control information included in the indication information, and their values may be the same or different. It is assumed that the sub-band width of each sub-band is 4 PRBs, and the frequency-domain starting position of the sub-band with the lowest frequency is the PRB with the smallest serial number in the PUSCH.

In this embodiment, the first frequency-domain starting position is the frequency-domain starting position of the sub-band with the lowest frequency among the first sub-bands, and it is assumed that the terminal and the network device appoint that the PRB with the lowest frequency in the frequency-domain resource allocated for the PUSCH is the subcarrier with the lowest frequency (subcarrier 0). Although the PRBs in the second first sub-band are discontinuous, they are PRBs corresponding to continuous VRB numbers in the frequency-domain resource allocated for the PUSCH. The first sub-bands have a one-to-one correspondence with the precoding matrix indicators (control information) of sub-bands. It is assumed that the resources allocated by the network device for the PUSCH are discontinuous in the frequency domain (PRB3 to PRB9 and PRB15 to PRB23). The terminal device may determine at least one first sub-band for transmitting the uplink signal according to the first frequency-domain starting position (of course, it may be determined in combination with some other information, for example, the size of the first sub-band, the quantity of first sub-bands, etc.), and may determine a precoding matrix of each sub-band according to the control information. Then, the precoder used for PUSCH transmission is the precoder corresponding to the sub-band where each PRB for transmitting the uplink signal in the PUSCH is located.

Based on the same inventive concept, an embodiment of the disclosure further provides a communication apparatus. Since this communication apparatus is the communication apparatus in the method in the embodiments of the disclosure and the principle of this communication apparatus to solve the problem is similar to that of the method, the implementations of this communication apparatus can refer to the implementations of the method, and the repeated description thereof will be omitted.

Figure 11:
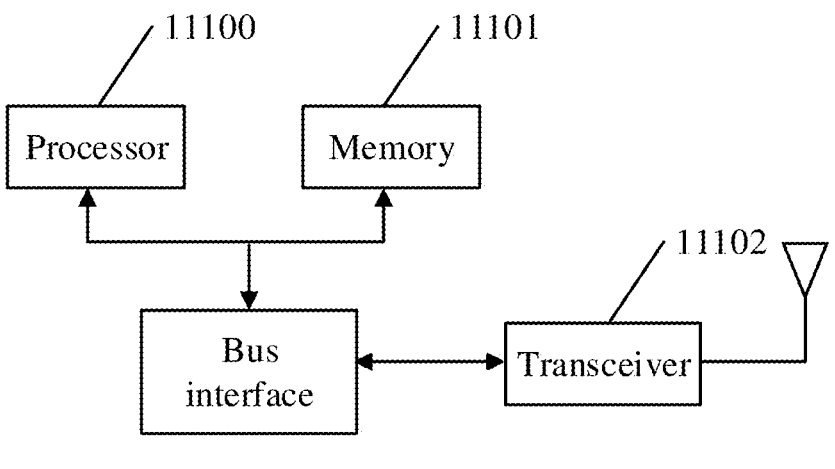
FIG. 11 shows one of schematic diagrams of a communication apparatus according to some embodiments of the disclosure.

As shown in FIG. 11, a communication apparatus of an embodiment of the disclosure includes: a processor 11100, a memory 11101 and a transceiver 11102.

The processor 11100 is responsible for managing the bus architecture and general processing, and the memory 11101 may store the data used by the processor 11100 when performing the operations. The transceiver 11102 is configured to receive and send the data under the control of the processor 11100.

The bus architecture may include any numbers of interconnected buses and bridges, and specifically link various circuits of one or more processors 11100 represented by the processor 11100 and the memory represented by the memory 11101. The bus architecture may further link various other circuits such as peripheral device, voltage regulator and power management circuit, which are all well known in the art and thus will not be further described again herein. The bus interface provides an interface. The processor 11100 is responsible for managing the bus architecture and general processing, and the memory 11101 may store the data used by the processor 11100 when performing the operations.

The procedure disclosed by the embodiment of the disclosure may be applied in the processor 11100 or implemented by the processor 11100. In the implementation process, each step of the signal processing flow may be completed by the integrated logic circuit of hardware in the processor 11100 or the instruction in the form of software. The processor 11100 may be a general-purpose processor 11100, a digital signal processor 11100, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor 11100 may be a microprocessor 11100 or any conventional processor 11100, etc. The steps of the method disclosed in combination with the embodiments of the disclosure may be directly completed by a hardware processor 11100, or completed by a combination of hardware and software modules in the processor 11100. The software modules may be located in the random access memory, flash memory, read only memory, programmable read only memory or electrically erasable programmable read only memory, register and other mature storage medium in the art. The storage medium is located in the memory 11101, and the processor 11100 reads the information in the memory 11101 and completes the steps of the signal processing flow in combination with its hardware.

Here, the processor 11100 is configured to read a program in the memory 11101 and perform the process of:

determining at least one first sub-band for transmitting an uplink signal in an uplink resource;

transmitting the uplink signal via the transceiver 11102 according to indication information of the uplink signal sent from a network device and the at least one first sub-band determined, wherein the indication information indicates a transmission parameter and/or a transmission antenna for the uplink signal.

Optionally, the processor is further configured to: determine a first frequency-domain starting position, and determine the at least one first sub-band according to the first frequency-domain starting position.

Optionally, the processor is further configured to: determine a plurality of second sub-bands in the uplink resource according to the first frequency-domain starting position, and determine the at least one first sub-band in the plurality of second sub-bands; or determine a plurality of second sub-bands in the uplink resource according to the first frequency-domain starting position and a sub-band width, and determine the at least one first sub-band in the plurality of second sub-bands; or determine the at least one first sub-band according to the first frequency-domain starting position, a sub-band width, and a frequency-domain resource allocated by the network device for the uplink signal; or determine the at least one first sub-band according to the first frequency-domain starting position, a sub-band width, and a quantity of sub-bands.

Optionally, a frequency-domain starting position of any one of the at least one first sub-band is obtained as the first frequency-domain starting position plus an offset that is an integer multiple of the sub-band width; or a frequency-domain starting position of each sub-band in the at least one first sub-band except a specified sub-band is obtained as the first frequency-domain starting position plus an offset that is an integer multiple of the sub-band width.

Optionally, the processor is further configured to: determine a sub-band corresponding to the frequency-domain resource allocated by the network device for the uplink signal in the plurality of second sub-bands as the at least one first sub-band according to the frequency-domain resource allocated by the network device for the uplink signal; or determine the at least one first sub-band according to an overlapping of the frequency-domain resource allocated by the network device for the uplink signal and the plurality of second sub-bands.

Optionally, the indication information includes control information corresponding to all or a part of second sub-bands included in the uplink resource; or the indication information includes control information of the at least one first sub-band for transmitting the uplink signal; and the control information is indicated respectively for the at least one first sub-band; or the indication information includes control information of a specified sub-band; where the specified sub-band is indicated by the network device or pre-agreed by the network device and the terminal device.

Optionally, the control information includes one or more of following:

indication information of a precoding matrix, indication information of the number of layers, spatial relation information, indication information of a SRS resource, indication information of a sending antenna, or indication information of an antenna panel.

Optionally, taking the first frequency-domain starting position as a frequency-domain starting position of a lowest-frequency sub-band, and determining a plurality of second sub-bands in the uplink resource according to the frequency-domain starting position of the lowest-frequency sub-band; or taking the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in frequency-domain resource of the uplink signal or in the uplink resource.

Optionally, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in the frequency-domain resource allocated by the network device for the uplink signal; or the first frequency-domain starting position is a frequency-domain position of a PRB indicated by the network device through signaling.

Optionally, the processor is further configured to:

determine a transmission parameter and/or a transmission antenna corresponding to the at least one first sub-band according to the indication information;

transmit the uplink signal according to the transmission parameter and/or using the transmission antenna through the at least one first sub-band via the transceiver 11102.

Based on the same inventive concept, an embodiment of the disclosure further provides another communication apparatus. Since this apparatus is the apparatus in the method in the embodiments of the disclosure and the principle of this apparatus to solve the problem is similar to that of the method, the implementations of this apparatus can refer to the implementations of the method, and the repeated description thereof will be omitted.

Figure 12:
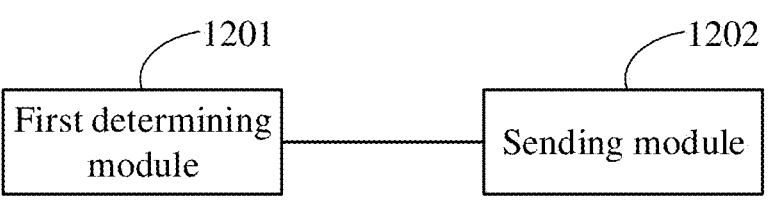
FIG. 12 shows one of schematic diagrams of a communication apparatus according to some embodiments of the disclosure.

As shown in FIG. 12, an embodiment of the disclosure further provides a communication apparatus, including:

a first determining module 1201 configured to determine at least one first sub-band for transmitting an uplink signal in an uplink resource;

a transmission module 1202 configured to transmit the uplink signal according to indication information of the uplink signal sent from a network device and the at least one first sub-band determined, where the indication information indicates a transmission parameter and/or a transmission antenna for the uplink signal.

Optionally, the first determining module is further configured to: determine a first frequency-domain starting position, and determine the at least one first sub-band according to the first frequency-domain starting position.

Optionally, the first determining module is further configured to:

determine a plurality of second sub-bands in the uplink resource according to the first frequency-domain starting position, and determine the at least one first sub-band in the plurality of second sub-bands; or determine a plurality of second sub-bands in the uplink resource according to the first frequency-domain starting position and a sub-band width, and determine the at least one first sub-band in the plurality of second sub-bands; or determine the at least one first sub-band according to the first frequency-domain starting position, a sub-band width, and a frequency-domain resource allocated by the network device for the uplink signal; or determine the at least one first sub-band according to the first frequency-domain starting position, a sub-band width, and a quantity of sub-bands.

Optionally, a frequency-domain starting position of any one of the at least one first sub-band is obtained as the first frequency-domain starting position plus an offset that is an integer multiple of the sub-band width; or a frequency-domain starting positions of each sub-band except a specified sub-band in the at least one first sub-band is obtained as the first frequency-domain starting position plus an offset that is an integer multiple of the sub-band width.

Optionally, the first determining module is further configured to:

determine a sub-band corresponding to the frequency-domain resource allocated by the network device for the uplink signal in the plurality of second sub-bands as the at least one first sub-band according to the frequency-domain resource allocated by the network device for the uplink signal; or determine the at least one first sub-band according to an overlapping of the frequency-domain resource allocated by the network device for the uplink signal and the plurality of second sub-bands.

Optionally, the indication information includes control information corresponding to all or a part of second sub-bands included in the uplink resources; or the indication information includes control information of the at least one first sub-band for transmitting the uplink signal; and the control information is indicated respectively for the at least one first sub-band; or the indication information includes control information of a specified sub-band; where the specified sub-band is indicated by the network device or pre-agreed by the network device and the terminal device.

Optionally, the control information includes one or more of following:

indication information of a precoding matrix, indication information of the number of layers, spatial relation information, indication information of an SRS resource, indication information of a sending antenna, or indication information of an antenna panel.

Optionally, taking the first frequency-domain starting position as a frequency-domain starting position of a lowest-frequency sub-band, and determining a plurality of second sub-bands in the uplink resource according to the frequency-domain starting position of the lowest-frequency sub-band; or taking the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in frequency-domain resource of the uplink signal or in the uplink resource.

Optionally, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in frequency-domain resource allocated by the network device for the uplink signal; or the first frequency-domain starting position is a frequency-domain position of a PRB indicated by the network device through signaling.

Optionally, the at least one first sub-band includes a plurality of PRBs;

the PRBs included in the at least one first sub-band are continuous; or there is a sub-band, in the at least one first sub-band, including non-continuous PRBs.

Optionally, the first determining module is further configured to:

determine a transmission parameter and/or a transmission antenna corresponding to the at least one first sub-band according to the indication information;

the transmission module is further configured to transmit the uplink signal according to the transmission parameter and/or using the transmission antenna through the at least one first sub-band.

Based on the same inventive concept, an embodiment of the disclosure further provides another communication apparatus. Since this apparatus is the apparatus in the method in the embodiments of the disclosure and the principle of this apparatus to solve the problem is similar to that of the method, the implementations of this apparatus can refer to the implementations of the method, and the repeated description thereof will be omitted.

Figure 13:
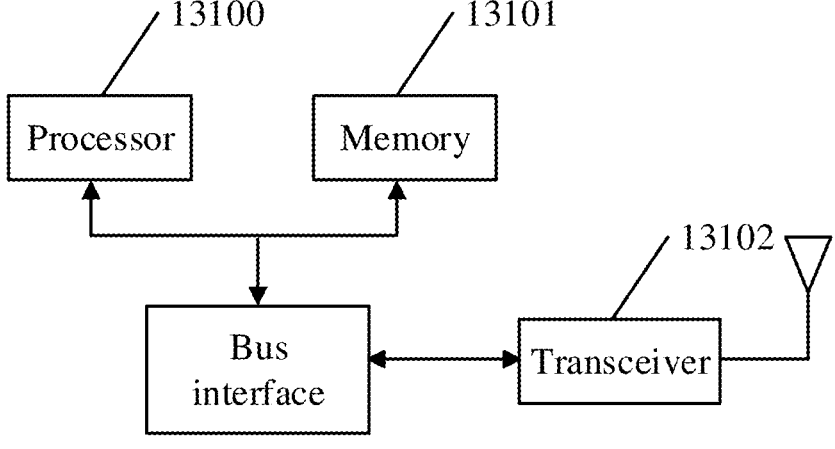
FIG. 13 shows one of schematic diagrams of a communication apparatus according to some embodiments of the disclosure.

As shown in FIG. 13, this apparatus includes: a processor 13100, a memory 13101 and a transceiver 13102.

The processor 13100 is responsible for managing the bus architecture and general processing, and the memory 13101 may store the data used by the processor 13100 when performing the operations. The transceiver 13102 is configured to receive and send the data under the control of the processor 13100.

The bus architecture may include any numbers of interconnected buses and bridges, and specifically link various circuits of one or more processors 13100 represented by the processor 13100 and the memory represented by the memory 13101. The bus architecture may further link various other circuits such as peripheral device, voltage regulator and power management circuit, which are all well known in the art and thus will not be further described again herein. The bus interface provides an interface. The processor 13100 is responsible for managing the bus architecture and general processing, and the memory 13101 may store the data used by the processor 13100 when performing the operations.

The procedure disclosed by the embodiment of the disclosure may be applied in the processor 13100 or implemented by the processor 13100. In the implementation process, each step of the signal processing flow may be completed by the integrated logic circuit of hardware in the processor 13100 or the instruction in the form of software. The processor 13100 may be a general-purpose processor 13100, a digital signal processor 13100, an application specific integrated circuit, a field programmable gate array or other programmable logic device, a discrete gate or transistor logic device, or a discrete hardware component, and may implement or perform each method, step and logical block diagram disclosed in the embodiments of the disclosure. The general-purpose processor 13100 may be a microprocessor 13100 or any conventional processor 13100, etc. The steps of the method disclosed in combination with the embodiments of the disclosure may be directly completed by a hardware processor 13100, or completed by a combination of hardware and software modules in the processor 13100. The software modules may be located in the random access memory, flash memory, read only memory, programmable read only memory or electrically erasable programmable read only memory, register and other mature storage medium in the art. The storage medium is located in the memory 13101, and the processor 13100 reads the information in the memory 13101 and completes the steps of the signal processing flow in combination with its hardware.

Here, the processor 13100 is configured to read a program in the memory 13101 and perform the process of:

determining a sub-band in an uplink resource of a terminal device, and determining indication information of an uplink signal using the sub-band; wherein the indication information indicates a transmission parameter and/or a transmission antenna for the uplink signal;

sending the indication information to the terminal device via the transceiver 13102.

Optionally, the processor is further configured to:

determine a first frequency-domain starting position, and determine the sub-band according to the first frequency-domain starting position.

Optionally, the processor is further configured to:

determine at least one first sub-band used by the terminal device to transmit the uplink signal in the uplink resource according to the first frequency-domain starting position and a sub-band width; or determine at least one first sub-band used by the terminal device to transmit the uplink signal in the frequency-domain resource allocated for the uplink signal of the terminal device according to the first frequency-domain starting position and a sub-band width; where the frequency-domain resource allocated for the uplink signal of the terminal device is included in the uplink resource; or determine at least one first sub-band for transmitting the uplink signal in the uplink resource according to the first frequency-domain starting position, a sub-band width, and a quantity of sub-bands; or determine a plurality of second sub-bands in the uplink resource according to the first frequency-domain starting position.

Optionally, the quantity of sub-bands is larger than one:

a frequency-domain starting position of any sub-band is obtained as the first frequency-domain starting position plus an offset that is an integer multiple of the sub-band width; or a frequency-domain starting position of each sub-band in the sub-bands except a specified sub-band is obtained as the first frequency-domain starting position plus an offset that is an integer multiple of the sub-band width.

Optionally, the indication information includes control information corresponding to all or a part of second sub-bands in the uplink resource; or the indication information includes control information of the at least one first sub-band; and the control information is indicated respectively for the at least one first sub-band; or the indication information includes control information of a specified sub-band; where the specified sub-band is pre-agreed by the network device and the terminal device or determined by the network device.

Optionally, the control information includes one or more of following:

indication information of a precoding matrix, indication information of the number of layers, spatial relation information, indication information of an SRS resource, indication information of a sending antenna, or indication information of an antenna panel.

Optionally, taking the first frequency-domain starting position as a frequency-domain starting position of a lowest-frequency sub-band, and determine a plurality of second sub-bands in the uplink resource according to the frequency-domain starting position of the lowest-frequency sub-band; or taking the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in the frequency-domain resource of the uplink signal or in the uplink resource.

Optionally, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in the frequency-domain resource allocated by the network device for the uplink signal.

Optionally, the processor is further configured to receive an uplink signal sent from the terminal device via the transceiver 13102; where the uplink signal is sent from the terminal device according to the transmission parameter and/or using the transmission antenna through a sub-band for transmitting the uplink signal.

Based on the same inventive concept, an embodiment of the disclosure further provides another communication apparatus. Since this apparatus is the apparatus in the method in the embodiments of the disclosure and the principle of this apparatus to solve the problem is similar to that of the method, the implementations of this apparatus can refer to the implementations of the method, and the repeated description thereof will be omitted.

Figure 14:
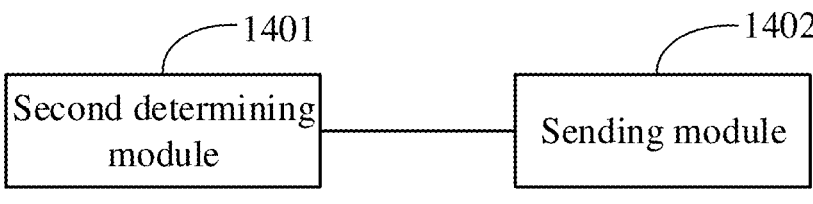
FIG. 14 shows one of schematic diagrams of a communication apparatus according to some embodiments of the disclosure.

As shown in FIG. 14, an embodiment of the disclosure further provides a communication apparatus, including:

a second determining module 1401 configured to determine a sub-band in an uplink resource of a terminal device, and determine indication information of an uplink signal in the sub-band; where the indication information indicates a transmission parameter and/or a transmission antenna for the uplink signal;

a sending module 1402 configured to send the indication information to the terminal device.

Optionally, the second determining module is further configured to:

determine a first frequency-domain starting position, and determine the sub-band according to the first frequency-domain starting position.

Optionally, the second determining module is further configured to:

determine at least one first sub-band used by the terminal device to transmit the uplink signal in the uplink resource according to the first frequency-domain starting position and a sub-band width; or determine at least one first sub-band used by the terminal device to transmit the uplink signal in a frequency-domain resource allocated for the uplink signal of the terminal device according to the first frequency-domain starting position and a sub-band width; where the frequency-domain resource allocated for the uplink signal of the terminal device is included in the uplink resource; or determine at least one first sub-band for transmitting the uplink signal in the uplink resource according to the first frequency-domain starting position, a sub-band width, and a quantity of sub-bands; or determine a plurality of second sub-bands in the uplink resource according to the first frequency-domain starting position.

Optionally, the quantity of sub-bands is larger than one:

a frequency-domain starting position of any sub-band is obtained as the first frequency-domain starting position plus an offset that is an integer multiple of the sub-band width; or a frequency-domain starting position of each sub-band in the sub-bands except a specified sub-band is obtained as the first frequency-domain starting position plus an offset that is an integer multiple of the sub-band width.

Optionally, the indication information includes control information corresponding to all or a part of second sub-bands in the uplink resource; or the indication information includes control information of the at least one first sub-band; and the control information is indicated respectively for the at least one first sub-band; or the indication information includes control information of a specified sub-band; where the specified sub-band is pre-agreed by the network device and the terminal device or determined by the network device.

Optionally, the control information includes one or more of following:

indication information of a precoding matrix, indication information of the number of layers, spatial relation information, indication information of an SRS resource, indication information of a sending antenna, or indication information of an antenna panel.

Optionally, taking the first frequency-domain starting position as a frequency-domain starting position of a lowest-frequency sub-band, and determining a plurality of second sub-bands in the uplink resource according to the frequency-domain starting position of the lowest-frequency sub-band; or taking the first frequency-domain starting position as a frequency-domain starting position of a lowest-frequency sub-band, and determining the at least one first sub-band according to the frequency-domain starting position of the lowest-frequency sub-band;

where the first frequency-domain starting position is a starting position of a frequency-domain resource corresponding to the indication information; and the frequency-domain resource corresponding to the indication information is included in the frequency-domain resource of the uplink signal or in the uplink resource.

Optionally, the first frequency-domain starting position is a frequency-domain position of a specified CRB; or the first frequency-domain starting position is a frequency-domain position of a specified PRB of an initial uplink BWP; or the first frequency-domain starting position is a frequency-domain position of a specified PRB in a BWP for transmitting the uplink signal; or the first frequency-domain starting position is a frequency-domain position of a specified PRB in an activated uplink BWP for transmitting scheduling information of the uplink signal; or the first frequency-domain starting position is a frequency-domain position of a specified PRB in a BWP for transmitting the indication information; or the first frequency-domain starting position is a frequency-domain position of a specified PRB in a specified BWP; or the first frequency-domain starting position is a frequency-domain position of a specified PRB in the frequency-domain resource allocated by the network device for the uplink signal.

Optionally, the apparatus further includes:

a receiving module configured to receive an uplink signal sent from the terminal device; where the uplink signal is sent from the terminal device according to the transmission parameter and/or using the transmission antenna through a sub-band for transmitting the uplink signal.

An embodiment of the disclosure further provides a computer-readable non-volatile storage medium including program codes. When the program codes run on a computing terminal, the program codes are configured to cause the computing terminal to perform the steps of the communication method of the embodiments of the disclosure described above.

The disclosure has been described above by reference to the block diagrams and/or flow charts showing the methods, devices (systems) and/or computer program products according to the embodiments of the disclosure. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Correspondingly, the disclosure can also be implemented by the hardware and/or software (including the firmware, resident software, microcode and the like). Further, the disclosure can adopt the form of computer program products on the computer usable or computer readable storage medium, which has the computer usable or computer readable program codes implemented in the medium, to be used by the instruction execution system or used in combination with the instruction execution system. In the context of the disclosure, the computer usable or computer readable storage medium can be any medium, which can include, store, communicate with, transmit or transfer the programs, to be used by the instruction execution system, apparatus or device, or used in combination with the instruction execution system, apparatus or device.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A communication method, comprising:

determining, by a terminal device, a first frequency-domain starting position;

determining, by the terminal device, at least one first sub-band for transmitting an uplink signal in an uplink resource according to the first frequency-domain starting position;

sending, by the terminal device, the uplink signal according to indication information of the uplink signal sent from a network device and the at least one first sub-band, wherein the indication information indicates a transmission parameter and/or a transmission antenna for the uplink signal;

wherein determining, by the terminal device, the at least one first sub-band in the uplink resource according to the first frequency-domain starting position, comprises one of following:

determining, by the terminal device, the first frequency-domain starting position as a frequency-domain starting position of a lowest-frequency sub-band, determining, by the terminal device, a plurality of second sub-bands in the uplink resource according to the frequency-domain starting position of the lowest-frequency sub-band, and determining the at least one first sub-band in the plurality of second sub-bands; or determining, by the terminal device, the first frequency-domain starting position as a frequency-domain starting position of a lowest-frequency sub-band, determining, by the terminal device, a plurality of second sub-bands in the uplink resource according to the frequency-domain starting position of the lowest-frequency sub-band and a sub-band width, and determining the at least one first sub-band in the plurality of second sub-bands;

wherein the first frequency-domain starting position is a starting position of a frequency-domain resource corresponding to the indication information; and the frequency-domain resource corresponding to the indication information is in the frequency-domain resource of the uplink signal or in the uplink resource;

the determining, by the terminal device, the at least one first sub-band in the plurality of second sub-bands, comprises:

determining, by the terminal device, the at least one first sub-band according to an overlapping between the frequency-domain resource allocated by the network device for the uplink signal and the plurality of second sub-bands.

2. The method according to claim 1, wherein determining, by the terminal device, the at least one first sub-band in the uplink resource according to the first frequency-domain starting position, comprises one of following:

determining, by the terminal device, the at least one first sub-band according to the first frequency-domain starting position, a sub-band width, and a frequency-domain resource allocated by the network device for the uplink signal; or determining, by the terminal device, the at least one first sub-band according to the first frequency-domain starting position, a sub-band width, and a quantity of sub-bands.

3. The method according to claim 1, wherein a frequency-domain starting position of each of the at least one first sub-band is obtained as the first frequency-domain starting position plus an offset that is an integer multiple of the sub-band width; or a frequency-domain starting position of each sub-band in the at least one first sub-band except a specified sub-band is obtained as the first frequency-domain starting position plus an offset that is an integer multiple of the sub-band width.

4. The method according to claim 1, wherein the indication information comprises control information corresponding to all or a part of second sub-bands included in the uplink resource; or the indication information comprises control information of the at least one first sub-band for transmitting the uplink signal, and the control information is indicated respectively for all or a part of the at least one first sub-band; or the indication information comprises control information of a specified sub-band; wherein the specified sub-band is indicated by the network device or pre-agreed by the network device and the terminal device.

5. The method according to claim 4, wherein the control information comprises one or more of following:

indication information of a precoding matrix, indication information of a quantity of layers, spatial relation information, indication information of an uplink Sounding Reference Signal, SRS, resource, indication information of a sending antenna, or indication information of an antenna panel.

6. The method according to claim 1, wherein determining, by the terminal device, the at least one first sub-band, comprises:

determining, by the terminal device, the first frequency-domain starting position as a frequency-domain starting position of the lowest-frequency sub-band, and determining the at least one first sub-band according to the frequency-domain starting position of the lowest-frequency sub-band.

7. The method according to claim 1, wherein the first frequency-domain starting position is one of following:

a frequency-domain position of a Common Resource Block, CRB;

a frequency-domain position of a Physical Resource Block, PRB, of an initial Uplink Bandwidth Part, UL BWP;

a frequency-domain position of a PRB in a BWP for transmitting the uplink signal;

a frequency-domain position of a PRB in an activated uplink BWP for transmitting scheduling information of the uplink signal;

a frequency-domain position of a PRB in a BWP for transmitting the indication information;

a frequency-domain position of a PRB in a BWP;

a frequency-domain position of a PRB in the frequency-domain resource allocated by the network device for the uplink signal; or a frequency-domain position of a PRB indicated by the network device through signaling.

8. The method according to claim 1, wherein the at least one first sub-band comprises a plurality of PRBs; wherein the plurality of PRBs comprised in the at least one first sub-band are continuous; or the at least one first sub-band comprises a first sub-band comprising non-continuous PRBs.

9. The method according to claim 1, wherein sending, by the terminal device, the uplink signal according to the indication information of the uplink signal sent from a network device and the at least one first sub-band, comprises:

determining, by the terminal device, a transmission parameter and/or a transmission antenna corresponding to the at least one first sub-band according to the indication information;

sending, by the terminal device, the uplink signal according to the transmission parameter and/or using the transmission antenna through the at least one first sub-band.

10. A communication method, comprising:

determining, a network device, a first frequency-domain starting position;

determining, by the network device, a sub-band in an uplink resource of a terminal device according to the first frequency-domain starting position;

determining, by the network device, indication information of an uplink signal in the sub-band; wherein the indication information indicates a transmission parameter and/or a transmission antenna for the uplink signal;

sending, by the network device, the indication information to the terminal device;

receiving, by the network device, the uplink signal sent from the terminal device, via at least one first sub-band for communicating the uplink signal;

wherein determining, by the network device, the sub-band in the uplink resource according to the first frequency-domain starting position, comprises:

determining, by the network device, the first frequency-domain starting position as a frequency-domain starting position of a lowest-frequency sub-band, determining, by the network device, a plurality of second sub-bands in the uplink resource according to the frequency-domain starting position of the lowest-frequency sub-band;

wherein the first frequency-domain starting position is a starting position of a frequency-domain resource corresponding to the indication information; and the frequency-domain resource corresponding to the indication information is in the frequency-domain resource of the uplink signal or in the uplink resource;

wherein the at least one first sub-band is determined according to an overlapping between the frequency-domain resource allocated by the network device for the uplink signal and the plurality of second sub-bands.

11. The method according to claim 10, wherein determining, by the network device, the sub-band in the uplink resource according to the first frequency-domain starting position, comprises one of following:

determining, by the network device, at least one first sub-band used by the terminal device to transmit the uplink signal in the uplink resource according to the first frequency-domain starting position and a sub-band width;

determining, by the network device, at least one first sub-band used by the terminal device to transmit the uplink signal in a frequency-domain resource allocated for the uplink signal of the terminal device according to the first frequency-domain starting position and a sub-band width; wherein the frequency-domain resource allocated for the uplink signal of the terminal device is included in the uplink resource; or determining, by the network device, at least one first sub-band for transmitting the uplink signal in the uplink resource according to the first frequency-domain starting position, a sub-band width, and a quantity of sub-bands.

12. The method according to claim 11, wherein the indication information comprises control information corresponding to all or a part of second sub-bands in the uplink resource; or the indication information comprises control information of the at least one first sub-band, and the control information is indicated respectively for all or a part of the at least one first sub-band; or the indication information comprises control information of a specified sub-band; wherein the specified sub-band is pre-agreed by the network device and the terminal device or determined by the network device.

13. The method according to claim 11, wherein determining, by the network device, at least one first sub-band in the uplink resource, comprises:

determining, by the network device, the first frequency-domain starting position as a frequency-domain starting position of the lowest-frequency sub-band, and determining the at least one first sub-band according to the frequency-domain starting position of the lowest-frequency sub-band.

14. The method according to claim 10, wherein the quantity of sub-bands is larger than one, wherein a frequency-domain starting position of each of the sub-bands is obtained as the first frequency-domain starting position plus an offset that is an integer multiple of the sub-band width; or a frequency-domain starting position of each sub-band in the sub-bands except a specified sub-band is obtained as the first frequency-domain starting position plus an offset that is an integer multiple of the sub-band width.

15. The method according to claim 10, wherein the first frequency-domain starting position is one of following:

a frequency-domain position of a Common Resource Block, CRB;

a frequency-domain position of a Physical Resource Block, PRB, of an initial uplink BWP;

a frequency-domain position of a PRB in a BWP for transmitting the uplink signal;

a frequency-domain position of a PRB in an activated uplink BWP for transmitting scheduling information of the uplink signal;

a frequency-domain position of a PRB in a BWP for transmitting the indication information;

a frequency-domain position of a PRB in a BWP; or a frequency-domain position of a PRB in the frequency-domain resource allocated by the network device for the uplink signal.

16. A communication apparatus, comprising a processor and a memory, wherein the memory is configured to store computer-executable instructions; and the processor, when executing the computer-executable instructions, causes the apparatus to perform the method according to claim 10.

17. A communication apparatus, comprising a processor and a memory, wherein the memory is configured to store computer-executable instructions; and the processor, when executing the computer-executable instructions, causes the apparatus to:

determine a first frequency-domain starting position;

determine at least one first sub-band for transmitting an uplink signal in an uplink resource according to the first frequency-domain starting position;

send the uplink signal according to indication information of the uplink signal sent from a network device and the at least one first sub-band, wherein the indication information indicates a transmission parameter and/or a transmission antenna for the uplink signal;

wherein the processor causes the apparatus to determine the at least one first sub-band in the uplink resource according to the first frequency-domain starting position by one of following:

determining the first frequency-domain starting position as a frequency-domain starting position of a lowest-frequency sub-band, determining a plurality of second sub-bands in the uplink resource according to the frequency-domain starting position of the lowest-frequency sub-band, and determining the at least one first sub-band in the plurality of second sub-bands; or determining the first frequency-domain starting position as a frequency-domain starting position of a lowest-frequency sub-band, determining a plurality of second sub-bands in the uplink resource according to the frequency-domain starting position of the lowest-frequency sub-band and a sub-band width, and determining the at least one first sub-band in the plurality of second sub-bands;

wherein the first frequency-domain starting position is a starting position of a frequency-domain resource corresponding to the indication information; and the frequency-domain resource corresponding to the indication information is in the frequency-domain resource of the uplink signal or in the uplink resource;

the determining the at least one first sub-band in the plurality of second sub-bands, comprises:

determining the at least one first sub-band according to an overlapping between the frequency-domain resource allocated by the network device for the uplink signal and the plurality of second sub-bands.

* * * * *